United States Patent
Matsui et al.

(10) Patent No.: US 9,602,842 B2
(45) Date of Patent: Mar. 21, 2017

(54) ENCODING APPARATUS AND METHOD OF CONTROLLING THE SAME

(71) Applicant: CANON KABUSHIKI KAISHA, Tokyo (JP)

(72) Inventors: Hideyuki Matsui, Tokyo (JP); Tomokazu Sato, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/871,024

(22) Filed: Sep. 30, 2015

(65) Prior Publication Data

US 2016/0100198 A1  Apr. 7, 2016

(30) Foreign Application Priority Data

Oct. 7, 2014 (JP) ................................. 2014-206674
Jul. 28, 2015 (JP) ................................. 2015-148849

(51) Int. Cl.
*G06K 9/36* (2006.01)
*H04N 19/89* (2014.01)
(Continued)

(52) U.S. Cl.
CPC .......... *H04N 19/89* (2014.11); *H04N 19/182* (2014.11); *H04N 19/597* (2014.11); *H04N 19/85* (2014.11)

(58) Field of Classification Search
USPC ................ 382/236, 238, 233, 232; 358/520; 375/240.12, E7.133, E7.142, E7.128
See application file for complete search history.

(56) References Cited

U.S. PATENT DOCUMENTS 6,148,109 A * 11/2000 Boon .................. H04N 19/619
                                                             375/E7.133
6,292,588 B1 * 9/2001 Shen .................. H04N 19/619
                                                             375/E7.133
(Continued)

FOREIGN PATENT DOCUMENTS

CN       103595991 A       2/2014
CN       103974063 A       8/2014
(Continued)

OTHER PUBLICATIONS

European Search Report issued in corresponding application No. 15185597.0 on Feb. 25, 2016.

(Continued)

*Primary Examiner* — Anh Do
(74) *Attorney, Agent, or Firm* — Carter, DeLuca, Farrell & Schmidt, LLP

(57) ABSTRACT

The invention provide an apparatus that enables encoding while suppressing a maximum distortion due to a compression of pixel values to an allowable error. The apparatus comprises a setting unit that sets transformation information for transforming a pixel value of a target image into a second pixel value in accordance with the allowable error information; a transformation unit that transforms each pixel value of the image based on the transformation information to generate a second image; a first unit that encodes the second image using an encoding unit for encoding such that a difference in a pixel value before and after encoding is within a constant δ; and a second unit that generates inverse transformation information for transforming a pixel value of the second image into a value related to a pixel value of the target image, and lossless-encodes the generated information.

11 Claims, 14 Drawing Sheets

(51) Int. Cl.
H04N 19/182 (2014.01)
H04N 19/85 (2014.01)
H04N 19/597 (2014.01)

(56) References Cited

U.S. PATENT DOCUMENTS

| | | | | |
|---|---|---|---|---|
| 7,072,396 B2* | 7/2006 | Wang | ............... | H04N 19/147 |
| | | | | 375/240.12 |
| 7,444,029 B2* | 10/2008 | Shen | ............... | H04N 19/619 |
| | | | | 375/240.12 |
| 2011/0280302 A1 | 11/2011 | Alshina et al. | | |
| 2013/0011063 A1 | 1/2013 | Kwon et al. | | |
| 2014/0036032 A1 | 2/2014 | Takahashi et al. | | |

FOREIGN PATENT DOCUMENTS

| | | |
|---|---|---|
| EP | 2624565 A1 | 8/2013 |
| WO | 2014/108095 A1 | 7/2014 |

OTHER PUBLICATIONS

Weinberger, "The LOCO-I Lossless Image Compression Algorithm: Principles and Standardization into JPEG-LS", IEEE Transaction on Image Processing, vol. 9, No. 8, Aug. 2000, pp. 1309-1324.
Office Action in corresponding Chinese Application No. 201510642273.0 mailed Dec. 28, 2016.

* cited by examiner

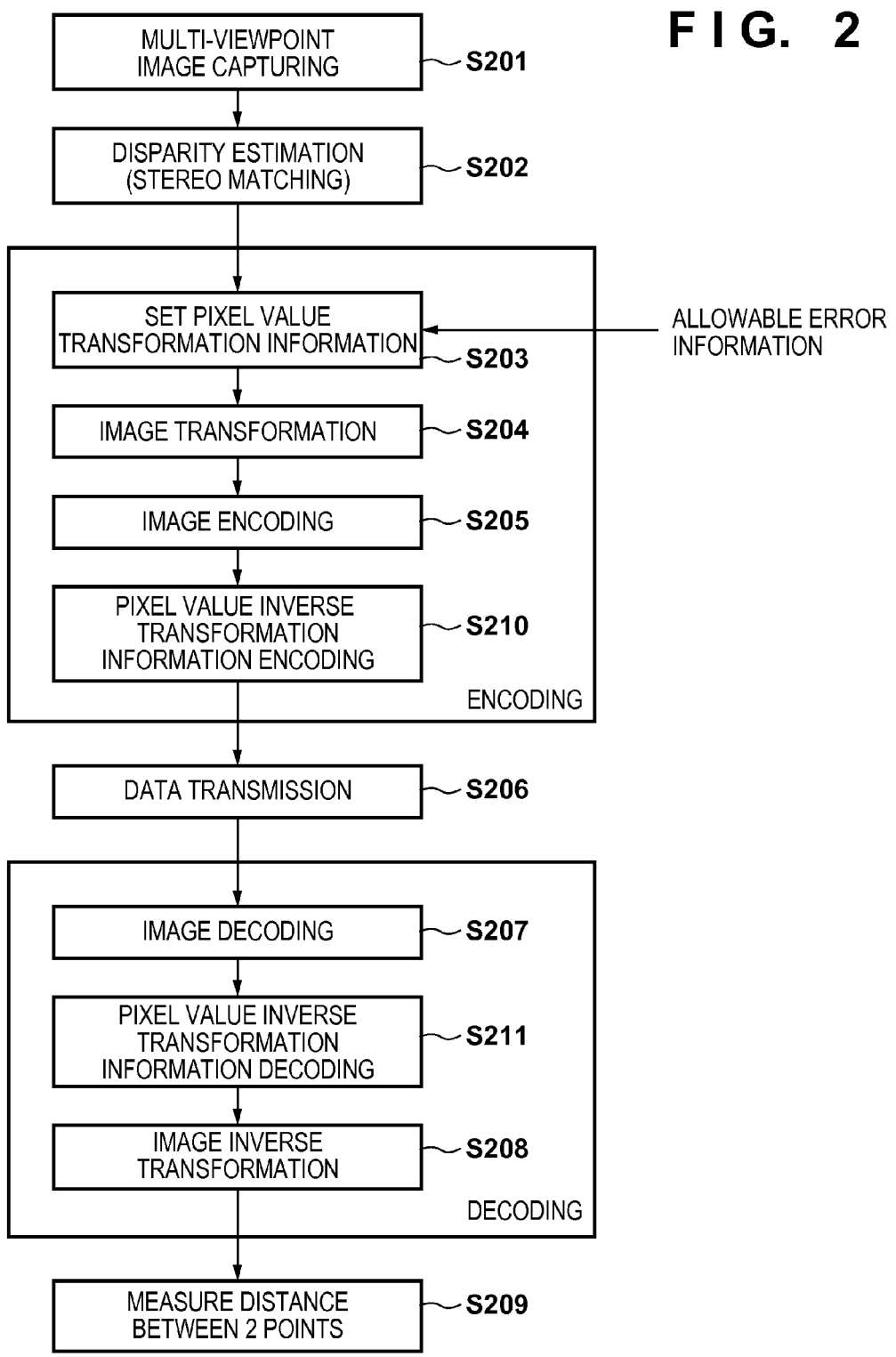

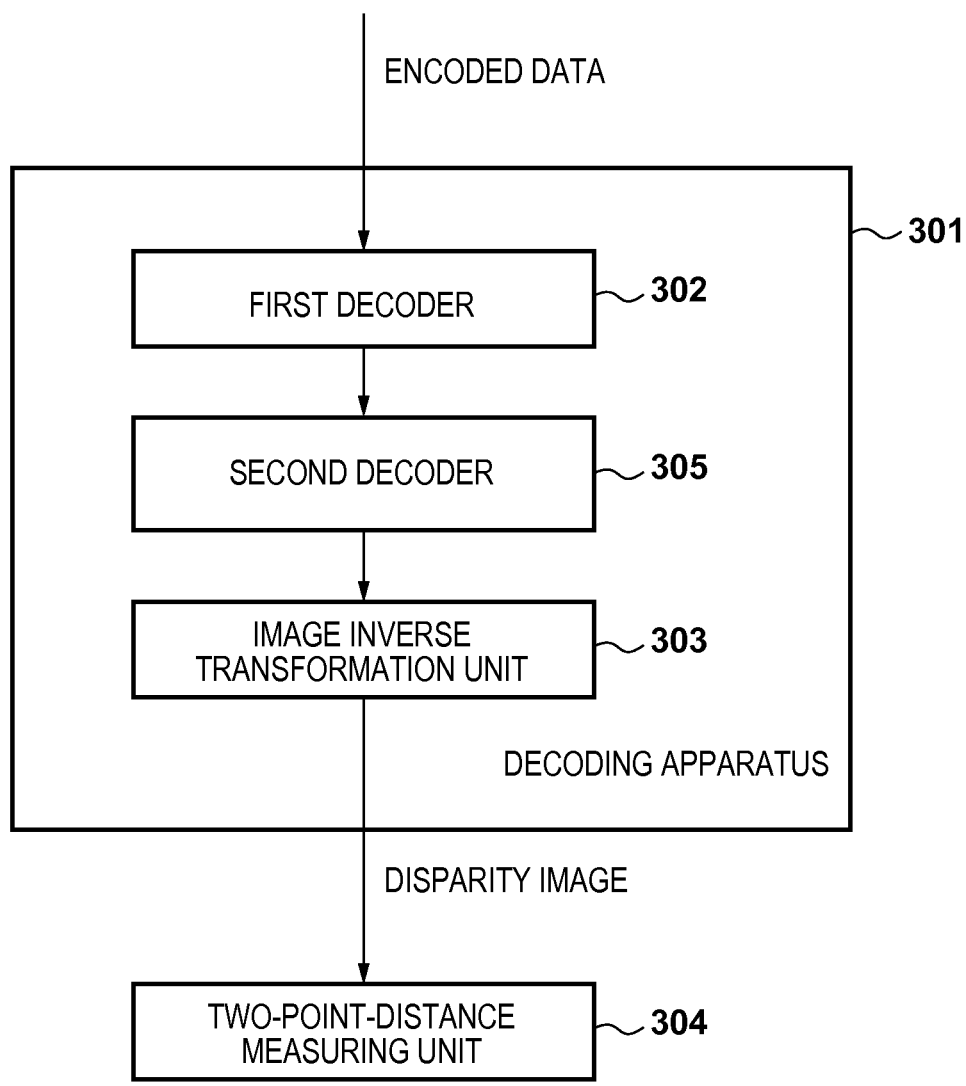

| INPUT PIXEL VALUE | 0 | 1 | 2 | 3 | 4 | 5 | 6 | 7 |
|---|---|---|---|---|---|---|---|---|
| ALLOWABLE ERROR (POSITIVE) | 1 | 1 | 1 | 1 | 2 | ②  | ① | ⓪ |
| ALLOWABLE ERROR (NEGATIVE) | ⓪ | ① | 1 | 1 | 1 | 2 | 2 | 2 |

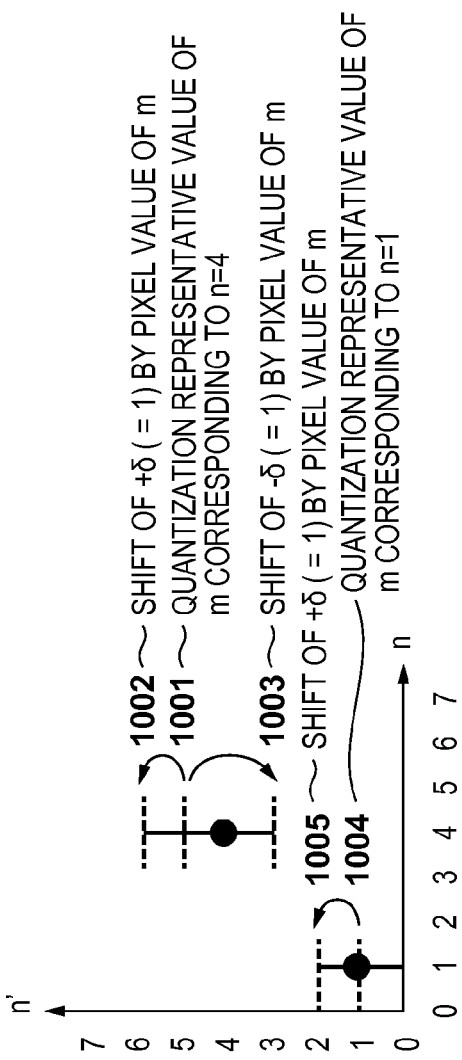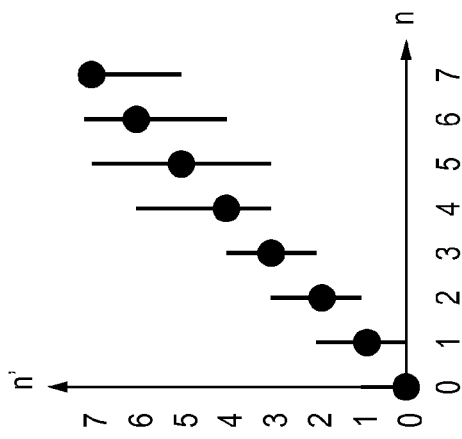

FIG. 13A

| n | 0 | 1 | 2 | 3 | 4 | 5 | 6 | 7 |
|---|---|---|---|---|---|---|---|---|
| m | 0 | 1 | 2 | 3 | 4 | 5 | 6 | 6 |

PIXEL VALUE TRANSFORMATION h

FIG. 13B

| n | 0 | 1 | 2 | 3 | 4 | 5 | 6 |
|---|---|---|---|---|---|---|---|
| m | 0 | 1 | 2 | 3 | 4 | 5 | 6 |

PIXEL VALUE TRANSFORMATION $h^{-1}$

FIG. 14A

| PIXEL VALUE n | ALLOWABLE ERROR (POSITIVE) | ALLOWABLE ERROR (NEGATIVE) |
|---|---|---|
| 0 | 2 | -2 |
| 1 | 2 | -2 |
| 2 | 2 | -2 |
| ⋮ | ⋮ | ⋮ |
| 145 | 6 | -5 |
| 146 | 6 | -5 |
| 147 | 6 | -5 |
| 148 | 7 | -6 |
| 149 | 7 | -6 |
| ⋮ | ⋮ | ⋮ |
| 1023 | 426 | -232 |

ALLOWABLE ERROR INFORMATION

FIG. 14B

| PIXEL VALUE n | SECOND PIXEL VALUE m |
|---|---|
| 0 | 0 |
| 1 | 1 |
| 2 | 2 |
| ⋮ | ⋮ |
| 145 | 131 |
| 146 | 131 |
| 147 | 132 |
| 148 | 132 |
| 149 | 132 |
| ⋮ | ⋮ |
| 1023 | 184 |

PIXEL VALUE TRANSFORMATION INFORMATION

FIG. 14C

| PIXEL VALUE m' BEFORE INVERSE TRANSFORMATION (JPEG-LS DECODED PIXEL) | PIXEL VALUE n' AFTER INVERSE TRANSFORMATION |
|---|---|
| 0 | 0 |
| 1 | 1 |
| 2 | 2 |
| ⋮ | ⋮ |
| 130 | 144 |
| 131 | 146 |
| 132 | 148 |
| 133 | 150 |
| 134 | 153 |
| ⋮ | ⋮ |
| 184 | 1023 |

PIXEL VALUE INVERSE TRANSFORMATION INFORMATION

|  | HUMAN BODY DETECTION MODE | ORIENTATION RECOGNITION MODE |
|---|---|---|
| SUFFICIENT PRECISION e [mm] | 100 [mm] | 30 [mm] |

ENCODING APPARATUS AND METHOD OF CONTROLLING THE SAME

BACKGROUND OF THE INVENTION

Field of the Invention

The present invention relates to an encoding apparatus and a method of controlling the same.

Description of the Related Art

Conventionally, a technique for encoding a depth image obtained from a distance measuring sensor, a stereo camera, or the like, is known. If a depth image is used, a free view-point image synthesis synthesizing video of a view-point that is not captured, a precision improvement in a human body detection, a measurement of a three dimensional distance between two points, or the like, is possible.

3D Video Coding (hereinafter referred to as 3DV) is established as a standard technology related to encoding of a depth image. In 3DV, a depth image is generated in order to perform a free-viewpoint video synthesis at a high image quality, but because a frequency transformation is performed similarly to in an encoding technique for an RGB image such as H.264, a large degradation in the proximity of an edge of the depth image occurs easily. A compression scheme by which a large degradation occurs in a portion of the pixels in this way may become a large problem depending upon a depth image usage approach. For example, in a case where a three dimensional measurement of a distance between two points is performed using a depth image, the result of measurement changes greatly when a pixel value whose distance information has greatly degraded due to the compression is used.

Meanwhile, a technique by which a maximum distortion due to a compression of pixel values of an image is suppressed to a particular value is known. For example, a near-lossless (quasi-lossless) mode is defined in "The LOCO-I Lossless Image Compression Algorithm: Principles and Standardization into JPEG-LS, (IEEE TRANSACTION ON IMAGE PROCESSING, VOL. 9, NO. 8, AUGUST 2000) (hereinafter referred to as document 1). If the JPEG-LS near-lossless mode is applied to a depth image, a maximum value of an error in a respective pixel in the depth image that occurs due to the compression is suppressed, and as a consequence even in a measurement of a distance between two points, it is possible to control a maximum value of an error in a measurement of a distance between two points that occurs due to compression.

However, in the near-lossless mode of JPEG-LS, it can only guaranteed that the error that occurs due to the compression will be of a fixed value irrespective of the pixel value (hereinafter referred to as constant precision guarantee). Accordingly, encoding that guarantees that a maximum distortion due to a compression of pixel values falls within an allowable error that differs in accordance with the pixel value cannot be performed (hereinafter referred to as guarantee of precision in accordance with the pixel value), and there are cases in which an encoding data amount increases due to a precision that is higher than necessary being maintained.

Here, an example of encoding of distance information is described below. In encoding of distance information it is common to encode the distance information by a disparity image which holds a disparity (=a shift in a corresponding point between differing images) obtained as a result of performing stereo matching of images from two viewpoints as a pixel value. A disparity expression is an expression in which a resolution of distance information is higher the shorter the distance is, and is an expression suited to the principle of stereo matching. In a case where encoding that guarantees a fixed error independent of the pixel value is applied to a disparity image, there is a property that degradation due to a compression of distance information is lower the shorter the distance is, and degradation due to the compression of the distance information is higher the longer the distance is. Meanwhile, it can be considered that there is a demand to reduce the amount of data of distance information by allowing a certain amount of error even at a short distance depending on one's purpose. For example, in a case where a height of a human body is measured by using distance information obtained from a disparity image, it can be considered that an error of about 1 cm is acceptable even at a short distance. Allowing an error of 1 cm here corresponds to a large shift (for example 3) in a pixel value in the case of a short distance, and a small shift (for example 1) in a pixel value in a case of a long distance being acceptable in a disparity expression. However, because, in a constant precision guaranteed encoding, a guarantee of precision cannot be performed in accordance with a pixel value in a manner of allowing a ±3 error at a short distance, for example, and a ±1 error at a long distance, it is difficult to respond to such a demand.

SUMMARY OF THE INVENTION

The present invention was conceived in view of the above described problems with conventional techniques. The present invention provides a technique for generating encoded data that suppresses a maximum distortion due to a compression of pixel values within a particular allowable error in accordance with each pixel value.

According to a first aspect of the present invention, there is provided an encoding apparatus operable to encode an image in accordance with allowable error information that defines an allowable error corresponding to a pixel value, the apparatus comprising: a setting unit which sets transformation information for transforming a pixel value of an image that is an encoding target into a second pixel value in accordance with the allowable error information; an image transforming unit which transforms each pixel value of an image that is an encoding target based on the pixel value transformation information to generate a second image comprised by the pixels after the transformation; a first encode control unit which encodes the second image using an encoding unit for encoding such that a difference in a pixel value before and after encoding is within a constant δ that is set in advance; and a second encode control unit which generates pixel value inverse transformation information, based on the pixel value transformation information, for transforming a pixel value of the second image into a value related to a pixel value of an input image, and encodes the pixel value inverse transformation information, wherein the setting unit sets, as the transformation information, information for performing a transformation such that, in a case where a pixel value of the second image is shifted by δ, a shift of a pixel value of an input image falls within an allowable error.

According to a second aspect of the present invention, there is provided a method of controlling an image encoding apparatus operable to encode an image in accordance with allowable error information that defines an allowable error corresponding to a pixel value, the method comprising: setting transformation information for transforming a pixel value of an image that is an encoding target into a second pixel value in accordance with the allowable error information; transforming each pixel value of an image that is an encoding target based on the pixel value transformation information to generate a second image comprised by the pixels after the transformation; encoding the second image using an encoding unit for encoding such that a difference in a pixel value before and after the encoding is within a constant δ that is set in advance; and generating pixel value inverse transformation information, based on the pixel value transformation information, for transforming a pixel value of the second image into a value related to a pixel value of an input image, and encoding the pixel value inverse transformation information using a lossless encoder, wherein information for performing a transformation, such that in a case where a pixel value of the second image is shifted by δ, a shift of a pixel value of an input image falls within an allowable error, is set as the transformation information.

By virtue of the present invention, it becomes possible to encode while suppressing a maximum distortion due to a compression of pixel values to a particular allowable error in accordance with each pixel value.

Further features of the present invention will become apparent from the following description of exemplary embodiments (with reference to the attached drawings).

BRIEF DESCRIPTION OF THE DRAWINGS

FIG. 2 is a flowchart according to the first embodiment.

FIG. 3 is a block diagram of a decoding apparatus according to the first embodiment, and a peripheral apparatus thereof.

FIGS. 10A and 10B are views for explaining a relationship between an allowable error and a pixel value transformation according to the third embodiment.

FIGS. 13A and 13B are views for explaining an embodiment of a pixel value transformation according to the third embodiment.

FIGS. 14A-14C are views for explaining an embodiment of processing according to the first embodiment.

DESCRIPTION OF THE EMBODIMENTS

Hereinafter, embodiments according to the present invention will be explained in detail in accordance with the accompanying drawings. Note that embodiments described below merely illustrate examples of specifically implementing the present invention, and are only specific embodiments of a configuration defined in the scope of the claims.

First Embodiment

In this embodiment, an example in which a distance within a three-dimensional space between two particular points is measured by acquiring a disparity image, performing a lossy compression, and configuring a 3D point group from a decoded disparity image is described.

Figure 1:
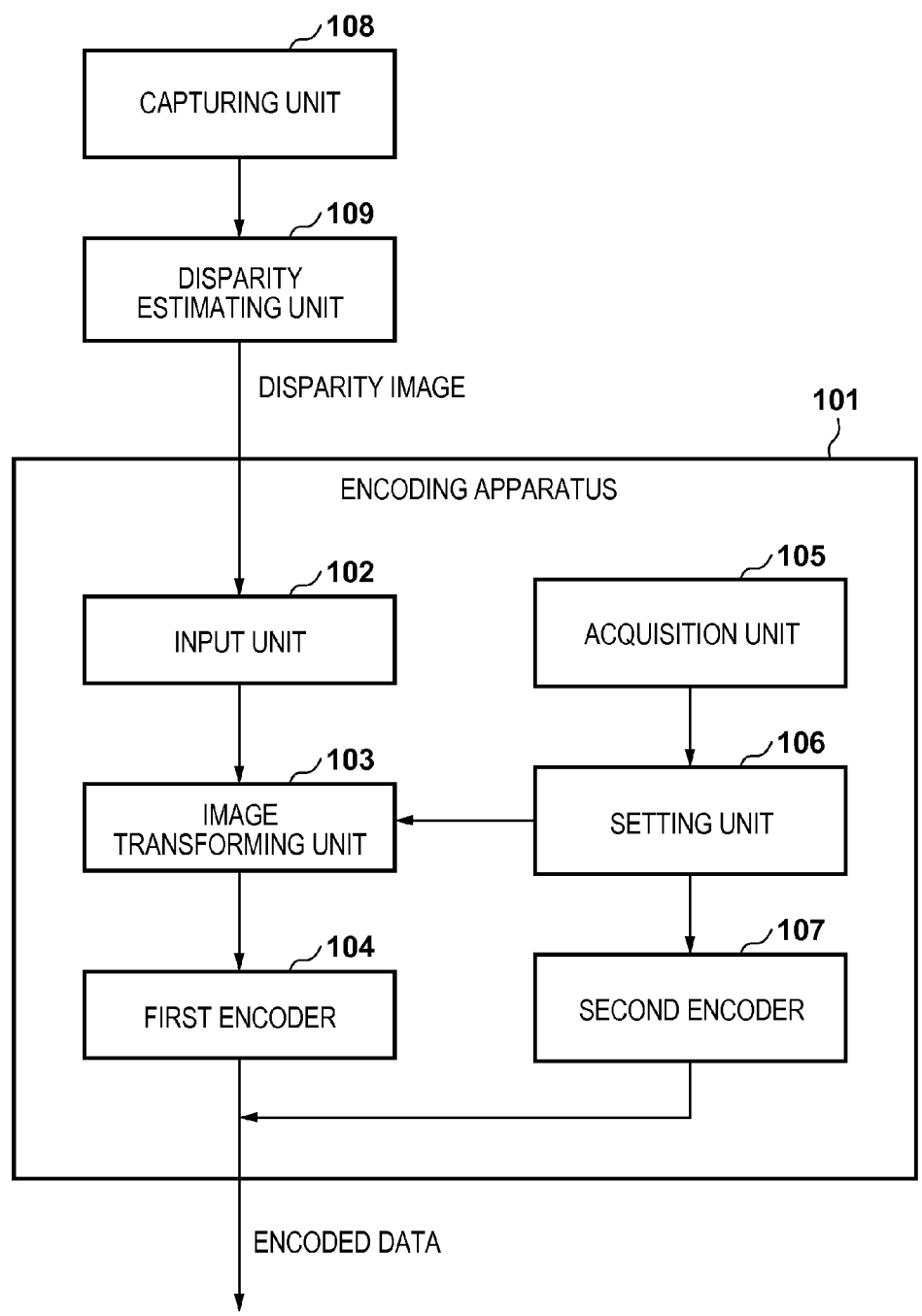
FIG. 1 is a block diagram of an encoding apparatus according to a first embodiment, and a peripheral apparatus thereof.

FIG. 1 is a block diagram of an encoding apparatus concerning the present embodiment, and a peripheral apparatus thereof. Below, explanation of each element comprising the figure, and functions thereof will be explained.

In a photographing unit 108, multi-viewpoint color images are captured. Then, in a disparity estimating unit 109, stereo matching is performed, and a disparity image is estimated from the multi-viewpoint images. Here, the disparity image is an image in which a disparity is caused to be held in a pixel value of each pixel. The disparity is an amount that indicates where a point that appears for one viewpoint appears in an image captured for another viewpoint when the same photographic subject (point) is captured from two differing viewpoints. Generally, how many pixels the points at which the same photographic subject appears (hereinafter referred to as corresponding points) are shifted from each other between differing images is expressed. More specifically, in a case where a point that is d[mm] from an imaged surface (a plane that passes through two cameras and is perpendicular to an optical axis) is captured by the two cameras which are arranged to be placed at an interval of a base line length B[mm] along a horizontal axis and whose optical axes are parallel, a disparity l[pix] of corresponding points within the two captured images is:

$$l=BFW/(dC)$$

Here, F is focal distance [mm] of the cameras, W is the width of the captured image [pix], and C is the width of the image sensor [mm]. Often in actual use, rather than using the disparity image pixel value l, $$n=l+A$$

may be used to perform a parallel shift of l by the constant A with the objective of reducing a bit depth of the disparity image (to reduce a tonal number). Accordingly, in the present specification, n will be referred to as the disparity. Additionally, in this case, the relationship between the disparity and the distance described above is:

$$n=BFW/(dC)+A \qquad (1)$$

Below, the discussion will be advanced using the disparity n.

Note that in a case where the cameras are correctly arranged laterally (horizontally), the disparity in a vertical direction of the corresponding points can be guaranteed to be 0, (an epipolar constraint). Accordingly, the disparity explained here will indicate a shift in a horizontal direction between the corresponding points.

Furthermore, the objective of the photographing unit 108 and the disparity estimating unit 109 is to obtain a disparity image, and so the above described method of doing so may be replaced. Because the disparity image is an amount expressed by applying a transformation of a distance between an image capturing apparatus and a photographic subject based on Equation 1, a distance information acquisition technique other than a stereo matching between multi-viewpoint images as described above can also be widely used. For example, there is an active stereo method in which a light that is pattern-irradiated is taken from a camera of a separate viewpoint, and a distance is measured from a distortion condition of the pattern, and there is a time-of-flight method in which a distance is estimated from a time that it takes a laser to make a round trip.

Next, explanation will be given of an encoding apparatus 101. The encoding apparatus 101 of the present embodiment inputs a disparity image which is an encoding target via an input unit 102. Then, the encoding apparatus 101 generates encoded data by performing compression encoding of the disparity image that is inputted in accordance with allowable error information acquired by an acquisition unit 105, and outputs that encoded data. Here, the allowable error information is information designating an allowable error for each pixel value, and the allowable error information is expressed by a function, a table, or the like. Also, the encoding apparatus 101 generates information for returning for an allowable error with respect to an original pixel upon decoding, and encodes it. The encoding apparatus 101 then multiplexes and outputs these two encoded data items, i.e. the encoded data of the information for returning for the allowable error and the encoded data of the disparity image.

A characteristic of the encoding apparatus 101 in the embodiment is in the point that it encodes the disparity image by suppressing a maximum value of errors generated due to the compression of the pixels of the disparity image to be less than or equal to the values designated by the allowable error information that the acquisition unit 105 acquired. In order to realize this, firstly a setting unit 106 sets pixel value transformation information for transforming pixel values of the input disparity image into second pixel values in accordance with the allowable error information. The pixel value transformation information expresses the transformation of a disparity pixel value into a second pixel value by a function, a table or the like. Next, an image transforming unit 103 generates a second image configured by post-transformation pixels by transforming each pixel of the input disparity image based on pixel value transformation information. Then, a first encoder 104 performs constant precision guaranteed encoding which compresses an image while guaranteeing that the shift due to compression of the pixel values for the second image that is generated falls within a constant δ. The first encoder 104 may use JPEG-LS which is given as a known technology. Note that δ may be any value; S may be calculated from allowable error information, or S may be set in advance. Also, encoding in the case where δ=0 means lossless encoding, and in such a case as well, the encoding apparatus 101 functions without problem. The setting unit 106 has an important role in performing encoding with a guarantee of precision in accordance with the pixel values. The setting unit 106 defines the pixel value transformation information such that when a second pixel value is changed by δ, and then a decoded pixel value is acquired by applying an inverse transformation that is determined by the pixel value transformation information for that, a shift between the decoded pixel value and the input disparity image pixel value falls within an allowable error. A second encoder 107 performs lossless encoding of information (hereinafter referred to as pixel value inverse transformation information) for transforming second pixel values into meaningful values. In other words, the second encoder 107 performs lossless encoding of information for specifying an inverse transformation of the setting unit 106. Note that "meaningful value" often means a pixel value of the input disparity image. The method of the lossless encoding is not limited particularly. Also, the pixel value inverse transformation information is provided in the form of a function, a table or the like.

In the encoded data that the encoding apparatus 101 outputs in embodiments, the following information (1) and (2) are included.
(1) Information for restoring a second image obtained from the first encoder 104
(2) Information for restoring pixel value inverse transformation information obtained from the second encoder 107

Note that the output destination of the encoded data is assumed to be a storage medium such as a memory card, but may be a network, and its type is not limited.

FIG. 3 illustrates a configuration of a decoding apparatus 301 that decodes the above described encoded data. The encoded data to be decoded is assumed to be input from the memory card, as described above, but it may be received via a network, and the type of the input source is not limited. Whatever the case, the decoding apparatus 301 inputs the encoded data, and a first decoder 302 restores a second image. Also, a second decoder 305 restores pixel value inverse transformation information. Then an image inverse transformation unit 303 restores the disparity image by applying an inverse transformation of the second image according to the pixel value inverse transformation information. The pixel values of the disparity image obtained by the decoding processing are within an allowable error range indicated by the allowable error information with respect to the pixel values of the disparity image of the encoding target in the encoding apparatus. The decoded disparity image is input into a two-point-distance measuring unit 304. In the two-point-distance measuring unit 304, a measurement of a three dimensional distance between two particular points is performed by configuring a 3D point group from the disparity image. In this way, in a case where the disparity is transformed into distance, it is necessary to include information required for the transformation from disparity to distance in the encoded data. Also, if encoded data is included in accordance with the allowable error information, the maximum error in a measurement of a distance between two points that occurs due to degradation of pixel values of the disparity image that is generated due to compression can be known. Additionally, using the disparity image for the measurement of the distance between two points is one example of an application of a decoded disparity image. For example, it is possible to use three-dimensional information obtained from the disparity image for a human body detection, a detection of a intruder who intruded into a particular region, or the like.

Next, a more detailed explanation of the configuration of the encoding apparatus 101 and content of processing thereof is given. In particular, details of pixel value transformation information setting processing that the setting unit 106 performs to realize an allowable error where allowable error information is specifically defined is described.

In order to explain the allowable error information set in the present embodiment, firstly a supplemental explanation of the disparity image which is the input into the encoding apparatus 101 is given. When Equation (1) is transformed, for the disparity n[pix] and the distance d[mm], the relationships:

$$d = BFW/(nC) \qquad (2)$$
$$= P/(n - A)$$
$$= f(n)$$

clearly hold true. Here, P=BFW/C. As can be seen from the relation of Equation (2), because the distance and the disparity are in an inversely-proportional relationship, when that relationship is graphed, the result is as in FIG. 4A. The following can be said from FIG. 4A.

Characteristic 1: the closer the distance between the camera and the photographic subject, the higher the resolution of the distance is, and conversely the further the distance, the lower the resolution of the distance is.

Characteristic 2: In a case where the distance is obtained by a triangulation method, an error in a measurement of a distance depends on an error in the searching of the corresponding points in the stereo matching, and therefore in the disparity expression, while on one hand an error occurs to the same extent regardless of the size of the disparity, on the other hand a greater error occurs the larger the distance is in the distance expression.

Considering the two characteristics described above, allowable error information in relation to the disparity image in the present embodiment is defined as follows.

Condition 1: "Allowing an error $\delta_0$[pix] of the disparity"

Condition 2: "When allowing an error of condition 1, in a region in which the distance error falls within e[mm], an error e[mm] of distance is allowed"

Here, it is advantageous that the parameter $\delta_0$ be defined from the error distribution of the stereo matching, and that e define a sufficient precision in accordance with one's purpose for using the distance information. An expression for allowing the error e[mm] of the condition 2 sets an allowable error in relation to the distance, but it is possible to simply convert to an allowable error in relation to the disparity from the transformation formula of Equation (1). In this way, for the input to the acquisition unit 105, information for indirectly specifying the allowable error in accordance with the pixel values of the input disparity image may be provided. The above described two conditions designate that the following relationships between a pixel value n of the input disparity image and a pixel value n' decoded via the encoding apparatus 101 and the decoding apparatus 301 are established.

$$\begin{cases} n' \leq \max[f^{-1}(f(n)-e), n+\delta_0] \\ n' \geq \min[f^{-1}(f(n)+e), n-\delta_0] \end{cases}$$

Additionally, the following equation (3) expresses this as a relationship between the pixel value n of the input disparity image and its allowable error $\delta_n(n)$:

$$\begin{cases} \delta_n(n) = \max[f^{-1}(f(n)-e)-n, \delta_0] \\ \delta_n(n) = \min[f^{-1}(f(n)+e)-n, -\delta_0] \end{cases} \quad (3)$$

Figure 5A:
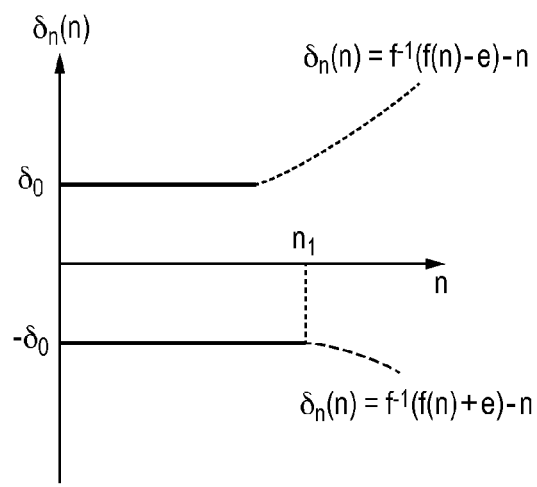
FIG. 5A and FIG. 5B are views for explaining allowable error information according to the first embodiment.

In other words, in the present embodiment, the allowable error information is determined by Equation (3). A graph of Equation (3) is illustrated in FIG. 5A. A solid line portion of the graph of FIG. 5A indicates an allowable error determined by condition 1, and the dotted line or broken line portion indicates an allowable error determined by condition 2. Note that, as can be seen from FIG. 5A, Equation (3) designates an error (an upper limit) in a positive direction of n, and an error (a lower limit) in a negative direction. However, in a case where it is possible to express the upper limit and the lower limit by equations that are the same other than the inversion of the sign, it may be that only one side is designated.

Figure 5B:
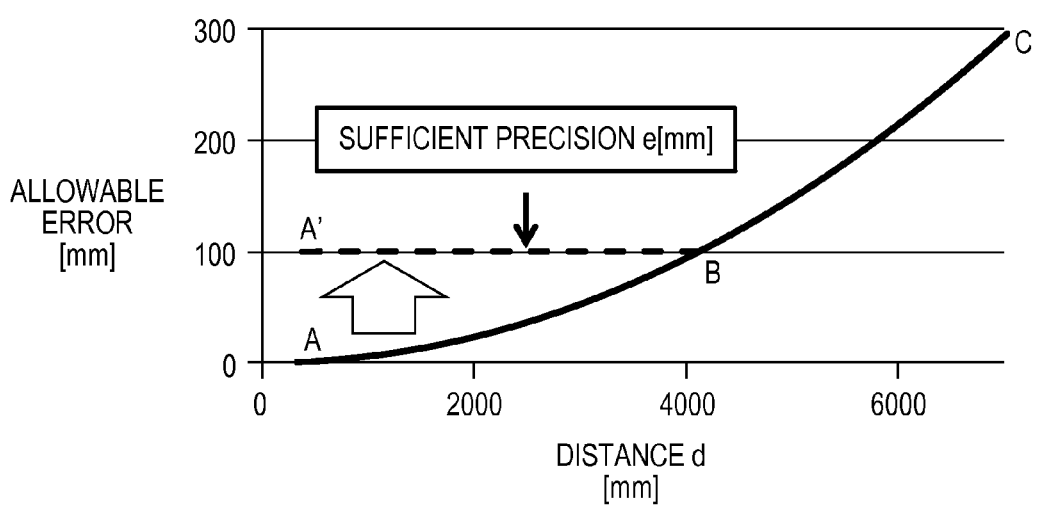

Note that FIG. 5A illustrates a relationship between the disparity and the allowable error, but this can be expressed as a relationship between distance d[mm] and the allowable error by the transformation formula of Equation 1 as shown by the curved line A'BC of FIG. 5B. Here, the curved line ABC of FIG. 5B expresses the allowable error in relation to the disparity which allows the error $\delta_0$[pix] of condition 1 as the allowable error in relation to the distance. In the present embodiment, as illustrated by the curved line BC of FIG. 5B, at a distance greater than or equal to a predetermined distance, encoding is performed while allowing an error in accordance with the distance measurement precision. Meanwhile, at a short distance that is less than a predetermined distance, the allowable error of the pixel value is controlled such that the maximum error in distance is a fixed value e, as is designated by condition 2. In FIG. 5B, an example in which e=100 [mm] is illustrated. This corresponds to the line A'B of FIG. 5B. With this, it is possible to reduce the amount of encoded data efficiently without excessively guaranteeing the precision of the distance information in a short distance portion in the compression.

Next, details of the setting unit 106 will be discussed. As previously described, the setting unit 106 obtains a transformation formula for transforming from an input pixel value n to a second pixel value m. Also at this time it is necessary to define the pixel value transformation information such that when a second pixel value is changed by $\delta$, and then a decoded pixel value is acquired by applying an inverse transformation that is defined by the pixel value transformation information for that, a shift between the decoded pixel value and the input pixel value falls within an allowable error. Below, when deriving a transformation from an input pixel value n to a second pixel value m, firstly a transformation formula g(m) for transforming from m to d is obtained, and then the following transformation formula (4) is obtained for transforming from n to m.

$$m = g^{-1}(f(n)) \quad (4)$$

In the derivation below, g(m) is derived by dividing into a region to which condition 1 is applied and a region to which condition 2 is applied for the allowable error information. Accordingly, below, each region is defined by dividing into two regions as shown in g(m) in FIG. 4C.

$$g(m) = \begin{cases} g_1(m) & (m \leq m_t) \\ g_2(m) & (m > m_t) \end{cases}$$

Here, $g_1(m)$ is a function for a region for which condition 1 is applied, and $g_2(m)$ is a function for a region for which condition 2 is applied. A value $m_t$ which defines a boundary of the two regions is a value into which the point $n_t$, at which it is switched whether condition 1 or condition 2 is applied for the lower limit of the allowable error in the allowable error information of FIG. 5A, is transformed into a second pixel value by the pixel value transformation explained below.

Firstly, $g_1(m)$ is obtained. $g_1(m)$ is a region where the allowable error for which condition 1 is applied is the constant $\delta_0$. Here, a transformation is not required, i.e. $g_1(m)=f(m)$, and encoding may be performed by the first encoder 104 with the constant precision guarantee precision parameter $\delta=\delta_0$. In this region, for the pixel value transformation from the input pixel value n to the second pixel value, m=n.

Figure 6:
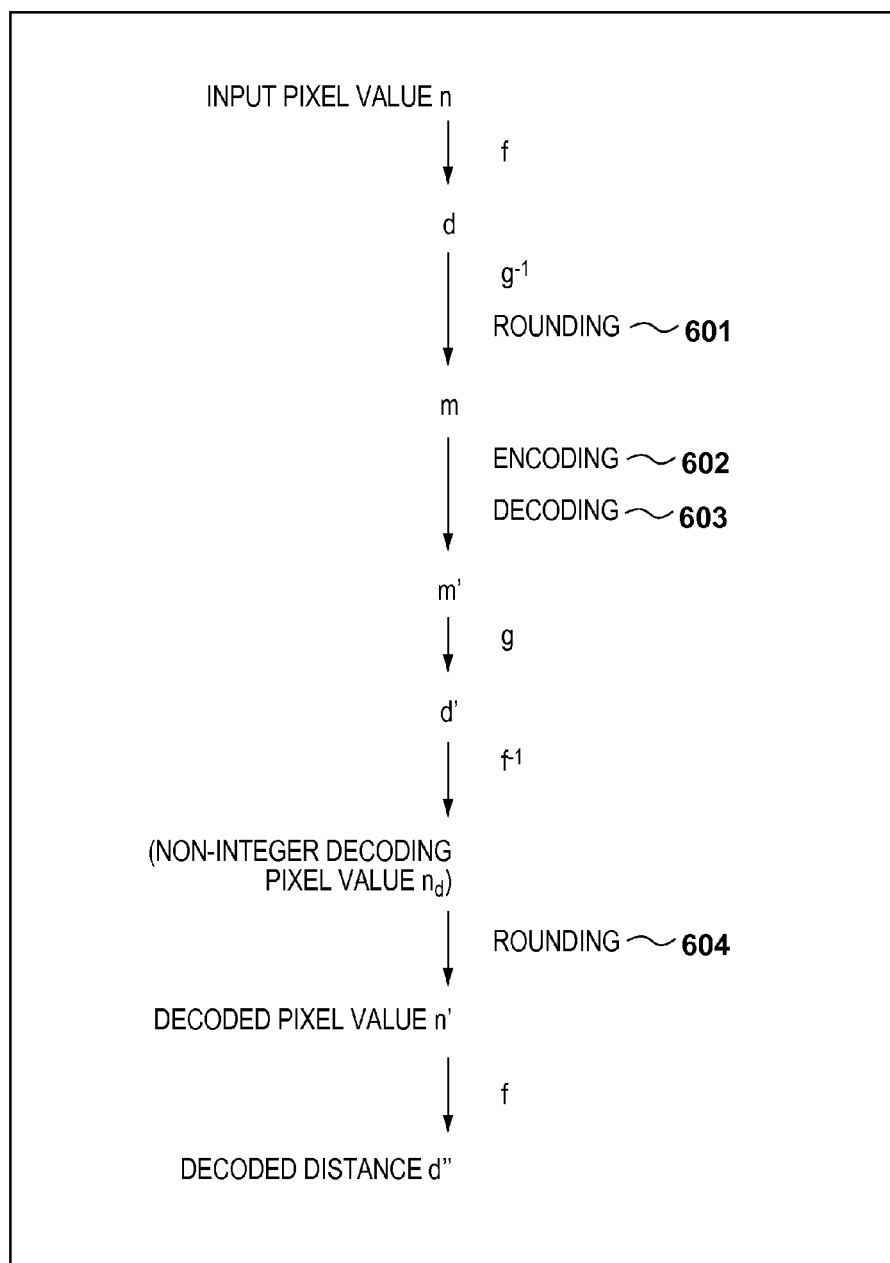
FIG. 6 is a view for explaining a flow of a data transformation according to the first embodiment.

Next, $g_2(m)$ is obtained. $g_2(m)$ is a function corresponding to a region where condition 2 of the allowable error information is applied. As can be seen from the graph of FIG. 5A, even with the expression of the input pixel value as is, if encoding is performed with the allowable error $\delta=\delta_0$, then it can be guaranteed that the error of the input image will fall within the allowable error. However, it can be considered that the compression rate will increase the more a transformation in which a larger error than $\delta_0$ may occur is performed, because in the region in which condition 2 is applied, a higher error is allowed. Regarding the allowable error information of the present embodiment, (the absolute value of) the allowable error is smaller for the lower limit that for an upper limit in the region in which condition 2 is applied. The pixel value transformation information is defined considering only the lower limit of the allowable error hereinafter. Actually, if a transformation derived below is applied, it is possible to confirm that the degradation of the input pixel value n due to the compression falls within the upper limit of the allowable error. For understanding of the derivation of $g_2(m)$, the flow of the data transformation in the present embodiment is illustrated in FIG. 6, and is described below. The input pixel value n that is provided is transformed into the distance d by performing a transformation f. Next, it is transformed into the second pixel value m by applying the inverse transformation $g^{-1}$ of g. Here, a rounding 604 is applied to round off to an integer. Up until this point is processing that is applied to each pixel by the image transforming unit 103. Next, encoding 602 and decoding 603 are applied to m, and m' is obtained. The difference between m and m' is $\delta=\delta_0$ at a maximum. This processing is performed by the first encoder 104 and the first decoder 302. Next, the transformation g is performed on m', and d' is obtained, and by applying the inverse transformation $f^{-1}$ of f and the rounding 604 to d', a decoded pixel value n' is obtained. This processing is performed by the image inverse transformation unit 303. In order to obtain the distance from the decoded pixel value n', a decoded distance d" is obtained by applying the transformation f. $g_2(m)$ must be defined such that in the data transformation illustrated in FIG. 6, the difference between d and d" falls within e at a maximum. As can be seen from FIG. 4C, for $g_2(m)$ it is necessary to consider the connection with $g_1(m)$, and therefore the derivation becomes slightly complicated. Accordingly, firstly a monotonically increasing function $g_0(m)$ that satisfies condition 2 is obtained. In the data transformation of FIG. 6, the error that occurs:

is a maximum of 0.5 in the rounding 601 is $\delta=\delta_0$ at a maximum in the encoding 602 and the decoding 603 is a maximum of 0.5 in the rounding 604.

Having considered these errors, in order to satisfy condition 2, it is sufficient that $g_0(m)$ satisfies the following conditional expression (5).

It is sufficient that the conditional expression $$\begin{cases} g_0(m+\delta+0.5) = f(L+0.5) \\ L = f^{-1}(f(n)+e) \\ g_0(0) = f(n_{max}) \end{cases} \quad (5)$$

be satisfied. Here, $n_{max}$ is a maximum value that a pixel value of the input disparity image can take. This conditional expression is solved as follows:

$$g_0(m) = \frac{\sqrt{D}}{1-k(m)} + \alpha$$

Here $$k(m) = k(0)R^{m/(\delta+0.5)}$$

and $$R = \frac{2P+\beta}{2P-\alpha}$$

Also, for $\alpha$ and $\beta$, there is a solution of the following equation ($\alpha<\beta$).

$$x = \frac{2P(x+e)}{x+2P+e}$$

Figure 4B:
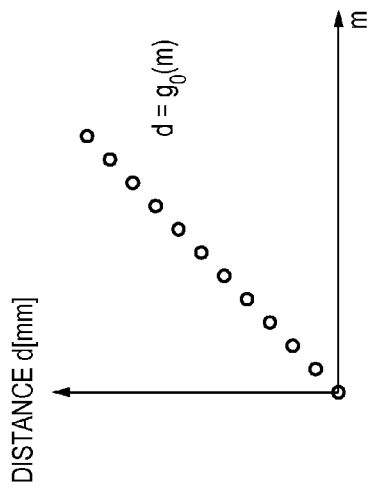
FIGS. 4A-4D are views for explaining a relationship between an input pixel value and a second pixel value.

Also, $h(0)$ may be defined such that $g_0(0)=f(n_{max})$ is satisfied. $g_0(m)$ obtained above is a monotonically increasing function as illustrated in FIG. 4B. For $g_2(m)$, considering the connection with $g_1(m)$ as illustrated in FIG. 4C, a parallel shift is made having inverted $g_0(m)$ to be monotonically decreasing, and $g_2(m)$ is obtained by $$g_2(m)=g_0(C-m) \quad (6)$$

Note that for C, a suitable constant may be defined considering the connection with $g_1(m)$.

Figure 4D:
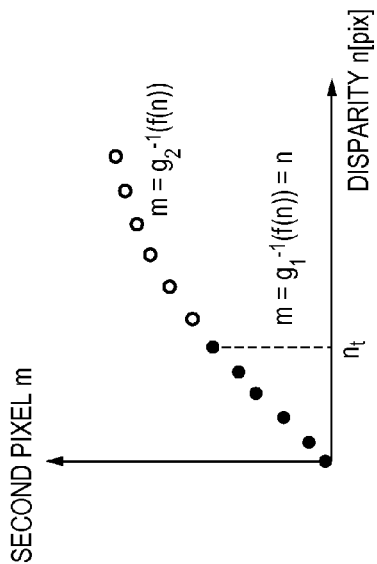
Figure 4A:
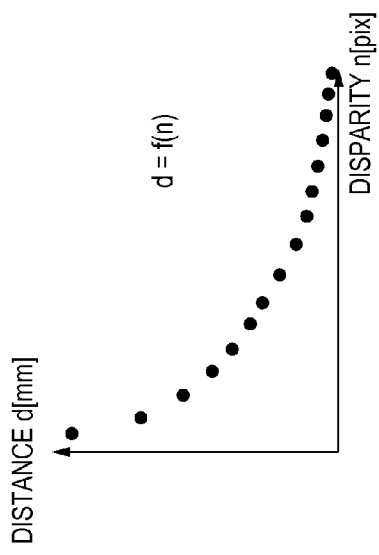
Figure 4C:
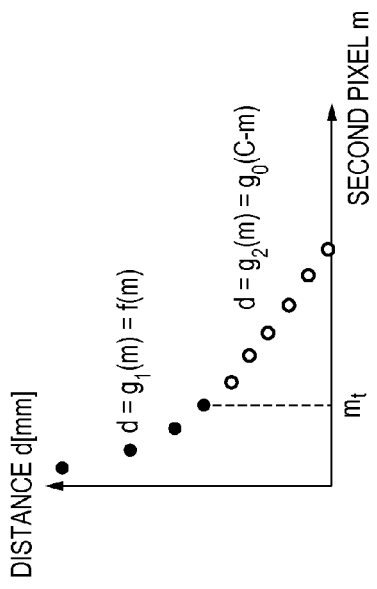

By applying the transformation of Equation (4) in relation to g(m) of FIG. 4C obtained by the above, the setting unit 106 can obtain transformation information illustrated in FIG. 4D. This concludes the explanation of each unit of the encoding apparatus 101 in the present embodiment.

Next, a flow of capturing, encoding processing, decoding processing, and processing for using the decoding information of the present embodiment is illustrated in the flowchart of FIG. 2. This processes essentially correspond to the processing of each of the units FIG. 1 or FIG. 3. In step S201, multi-viewpoint image capturing is performed. This is processing that the photographing unit 108 performs. In step S202, a disparity estimation is performed by stereo matching. This is processing that the disparity estimating unit 109 performs. In step S203 the allowable error information is acquired as input, and the pixel value transformation information is set. This is processing that the setting unit performs. In step S204, based on the set pixel value transformation information, a second image is obtained by transforming the pixel values of the disparity image obtained in step S202. This corresponds to the image transforming unit 103. In step S205, encoding of the second image is performed. This is processing that the first encoder 104 performs. In step S210, information for which each pixel value of the second image is transformed into an input pixel value is encoded. This is processing that the second encoder 107 performs. In step S206, encoded data of the second image obtained in step S205, and encoded data of the information for performing the inverse transformation of the pixel value transformation information calculated in step S203 is transmitted. In step S207, the second image is decoded. This corresponds to the first decoder 302. In step S211, the pixel value inverse transformation information is decoded. The second decoder 305 performs this. In step S208, an inverse transformation determined by the pixel value inverse transformation information is performed on the second image. The image inverse transformation unit 303 performs this processing. Finally, in step S209, a measurement of the distance between the two points is performed. The two-point-distance measuring unit 304 performs this processing. This concludes the explanation of the processing flow of the present embodiment according to FIG. 2.

In the embodiments described above, an example in which the pixel value transformation information and the pixel value inverse transformation information are functions that can be expressed by few parameters is described. In general, the pixel value inverse transformation information is table information to enumerate second pixel values in relation to input pixel values, and because this table must be included in the encoded data, there is the possibility that the amount of data will increase. However, because it is sufficient that only a few parameters be sent as pixel value inverse transformation information in the example described in the present embodiment, there is the effect that it is possible to reduce the amount of data accordingly. Note that it is advantageous that the pixel value inverse transformation information be reversibly compressed in order to achieve an objective of encoding with a guarantee of precision. However, because the amount of data increases in a case where the pixel value inverse transformation information is sent in a table, performance of a lossy compression where the table is approximated by a function and its parameters are sent can also be considered. In such a case, the object of encoding with a guarantee of precision can be achieved if it is confirmed on the encoding apparatus whether the difference between the input pixel value n and an output pixel value n' falls within an allowable error using pixel value inverse transformation information decoded by a lossy compression.

Next to help with understanding, explanation of a more specific example of the encoding apparatus 101 will be given using FIGS. 14A-14C. Note that in the following concrete example, the specific values of parameters appearing in the foregoing explanation are P=348000, e=100, $\delta_0$=2, $n_{max}$=1023, C=184, and $n_f$=102. The allowable error information, the pixel value transformation information, and the pixel value inverse transformation information are illustrated in tabular form in FIG. 14A, FIG. 14B, and FIG. 14C. Note that as described above, it is possible to obtain the tables shown here by decimal function parameters. In the present example, a pixel value of a disparity image is expressed in 10 bits. Because there are 10 bits, the range that the pixel value can take is 0-1023.

Below, explanation is given for the pixel value n' which is the result obtained by the input pixel value n=147 in FIG. 14A being encoded by the encoding apparatus 101, and decoded through the decoding apparatus 301 falling within an allowable error. The pixel value n, as illustrated in FIG. 14B, is transformed into a second pixel value m=132 by the image transforming unit 103. Then, the pixel value m is encoded with an error of $\delta$=2 at a maximum by the first encoder 104, and is decoded by the first decoder 302. m' which is obtained as a result can take a value from 130-134. Finally, in the image inverse transformation unit 303, m' is transformed into n'. As is illustrated by the arrow symbols of FIG. 14C, n' can take the values 144-153. Because this falls within the range of the allowable error 142-153 of n that is designated by the allowable error information of FIG. 14A, it can be seen that the object of the encoding apparatus is certainly fulfilled.

In the foregoing, a method of inputting the allowable error information by a parameter of a curved line as expressed by condition 1 and condition 2 to the acquisition unit 105 is described, but a method that obtains the allowable error information adaptively in accordance with the image can also be considered. For example, human body detection processing is applied to a color image acquired by the photographing unit 108, and with reference to the disparity image of the same viewpoint, a pixel value distribution of the disparity image in a region in which a human body exists is obtained, and for pixel values in which many pixels exist in the pixel value distribution, the allowable error is made to be smaller. If this processing is more generalized, the acquisition unit 105 has a region of interest specification unit for specifying a region of interest, and an allowable error information calculation unit for calculating allowable error information with reference to the pixel values in the region of interest. In such a case, the transformation information obtained by the setting unit 106 differs with what is illustrated in FIG. 4D. However, it is similar in that it is sufficient to obtain transformation information that satisfies the rule that, as described previously, when a second pixel value is changed by $\delta$, and then a decoded pixel value is acquired by applying an inverse transformation of a transformation that is determined by the pixel value transformation information for that, a shift between the decoded pixel value and the input pixel value falls within an allowable error.

Also, in the above explanation, the encoding apparatus 101 is only used for the disparity image encoding, but the encoding apparatus 101 is not limited to a disparity image, and may be applied to any image (i.e. a gray image, a color image, or the like). As examples of a gray image, physical amounts such as a distance, a temperature, a brightness, or the like, can be considered. As an example of a color image, it can be considered that a plurality of color images are acquired to perform a disparity estimation in the photographing unit 108, and one or more color images that are acquired here is encoded by the encoding apparatus 101. In such a case, it is possible to share color images and disparity images on similar encoding apparatuses, and there is the merit that the system becomes simpler.

Also, it can be considered that encoding that is different to that of the encoding apparatus 101 such as JPEG is applied to the above described color images. Here, because it is possible with JPEG to encode at differing image qualities in units of blocks, it can be considered that with reference to disparity images of the same viewpoint, high compression may be set by reducing the image quality of blocks for the color image as well for blocks having many pixels for which the allowable error is large. This is not limited to JPEG, and can be realized for all image encoding schemes for which a compression rate is controllable by region.

Also, in the above described explanation, explanation was given for an example of JPEG-LS in the first encoder 104. This is encoding in which it is guaranteed that the difference when subtracting, from the encoding target pixel value, a pixel value into which that is decoded will fall within $-\delta$ or greater and $\delta$ or less. However, a basic consideration of the present invention is that it is possible to apply maximum errors occurring in the positive and negative directions that are non-symmetrical. For example, encoding in which the difference when subtracting, from the encoding target pixel value, a pixel value into which that is decoded will fall within 0 or greater and 1 or less can be applied. Even in such a case, because the difference that occurs is −1 or more and 1 or less, it is sufficient to apply the pixel value transformation described above with $\delta$=1. Also, by using the non-symmetry of the maximum errors, a more optimal pixel value transformation may be obtained. In such a case, it is sufficient that transformation information satisfying the rule, that a shift between a decoded pixel value and an input pixel value falls within an allowable error even if a maximum error that can occur in the first encoder 104 occurs in the second pixel value, can be obtained. Note that encoding for realizing an error that is 0 or more and 1 or less can be realized easily by prediction encoding similar to JPEG-LS. In other words, in a scheme of encoding each pixel in a raster scan order, a pixel value of an encoding target may be predicted from a pixel value of a periphery, and a value for which a least significant bit is rounded down when expressing a prediction error in binary may be entropy encoded.

This concludes explanation of the present embodiment. By the above-described configuration, it is possible for the encoding apparatus 101 to encode an image while suppressing a maximum value of an error that occurs due to the compression of the pixels of the image input by the input unit 102 to less than or equal to an allowable error acquired by the acquisition unit 105.

Variation of First Embodiment

Figure 7:
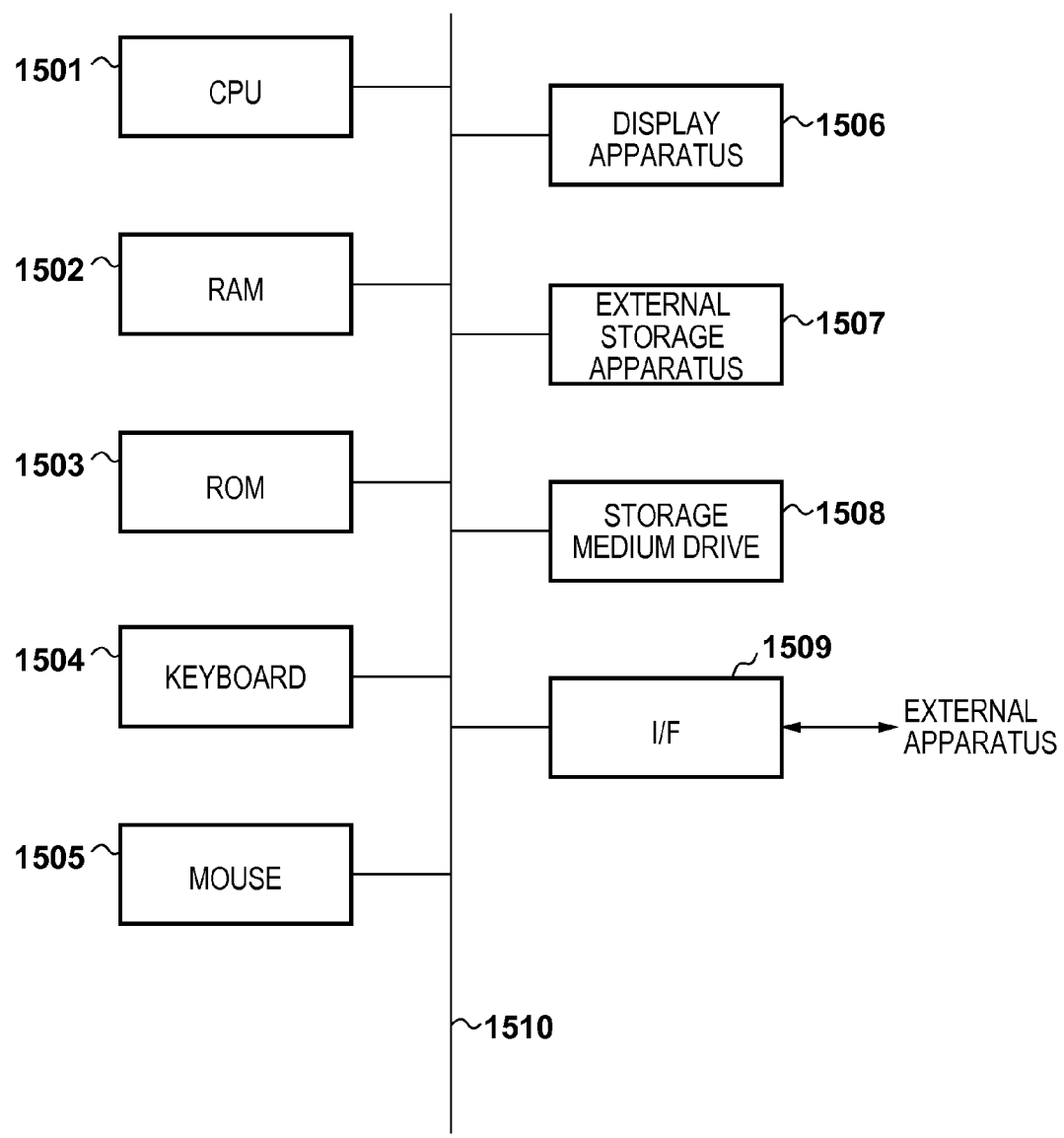
FIG. 7 is a block configuration diagram of a computer.

Each unit of the encoding apparatus 101 illustrated in FIG. 1 may be configured by hardware, or may be implemented as software (a computer program). In this case, the software is installed in a memory of a general computer such as a PC (a personal computer). Then, by a CPU of the computer executing this installed software, the computer realizes the functions of the image processing apparatus described above. Specifically, this computer can be applied to the image processing apparatus described above. For a hardware configuration example of the computer that is applicable to the encoding apparatus of the first embodiment, explanation is given using the block diagram of FIG. 7.

A CPU 1501 using a computer program, data, or the like, stored in a RAM 1502, a ROM 1503, or the like, performs control of the computer on the whole, and executes each above described process explained as something that the image processing apparatus performs. The RAM 1502 is an example of a non-transitory computer-readable storage medium. The RAM 1502 functions as an area for temporarily storing a computer program, data, or the like, which is loaded from an external storage apparatus 1507, a storage medium drive 1508, or a network interface (not shown). Furthermore, the RAM 1502 functions as a work area used when the CPU 1501 executes various processes. Specifically, the RAM 1502 can provide various areas as appropriate. The ROM 1503 is an example of a non-transitory computer-readable storage medium, and stores setting data of the computer, a boot program, or the like.

A keyboard 1504 and a mouse 1505 can input various instructions to the CPU 1501 upon operation by an operator of the computer. A display apparatus 1506 is comprised of a CRT, a liquid crystal screen, or the like, and is capable of displaying a result of processing by the CPU 1501 in images, text, or the like.

The external storage apparatus 1507 is an example of a computer-readable storage medium, and is a large capacity information storage device as typified by a hard disk drive device. In the external storage apparatus 1507, an OS (operating system), a computer program, data, or the like, for the CPU 1501 to realize the various processes illustrated in FIG. 1, the above-described tables, a database, or the like, is saved. A computer program, data, or the like, that is saved in the external storage apparatus 1507 is loaded into the RAM 1502 as appropriate in accordance with control by the CPU 1501, and becomes a target of processing by the CPU 1501.

The storage medium drive 1508 reads a computer program, data, or the like, which is stored in a storage medium such as a CD-ROM, a DVD-ROM, or the like, and outputs the read computer program, data, or the like, to the external storage apparatus 1507, the RAM 1502, or the like. Additionally, all or a portion of the information explained as being saved in the external storage apparatus 1507 may be stored in this storage medium, and may be read into the storage medium drive 1508.

An I/F 1509 is an interface for inputting a color image, a depth image, or the like from outside, and one example that illustrates the I/F 1509 is a USB (Universal Serial Bus). Reference numeral 1510 denotes a bus that connects each unit described above.

In the above described configuration, when the power supply of the computer is turned ON, the CPU 1501 loads the OS from the external storage apparatus 1507 into the RAM 1502 in accordance with the boot program stored in the ROM 1503. As a result, it becomes possible to perform information input operations via the keyboard 1504 and the mouse 1505, and it becomes possible to display a GUI on the display apparatus 1506. When the user inputs an instruction to activate an encoding application stored in the external storage apparatus 1507 by operating the keyboard 1504, the mouse 1505, or the like, the CPU 1501 loads the program into the RAM 1502 and executes it. With this, the computer functions as an image processing apparatus.

Note that an encoding application program that the CPU 1501 executes comprises functions (or a subroutines) generally corresponding to each unit belonging to the encoding apparatus 101 of FIG. 1. Here, an image processing result is saved in the external storage apparatus 1507. Note that this computer similarly is applicable to an encoding apparatus corresponding to embodiments below, and this will be clear from the explanation below.

Second Embodiment

In the first embodiment, in the data transformation flow of FIG. 6, the decoded distance d" is obtained having obtained the decoded pixel value (the disparity) n'. However, in a case where the disparity n' is unnecessary upon decoding, and it is sufficient to be able to acquire only the distance, the encoded data that the encoding apparatus 101 outputs is as follows.

information necessary for restoring the second image which is obtained from the first encoder 104 (information necessary for decoding m')

information for obtaining the distance d' from the pixel value m' of the second image (function g parameter)

Out of these, the former is common to the first embodiment, and the latter is an example that is different to the first embodiment of the "pixel value inverse transformation information". Note that, in the first embodiment, as pixel value inverse transformation information, information for obtaining the decoded pixel value n' from the pixel value m' of the second image is encoded. Generalizing this concept, the pixel value inverse transformation information is not only information for transforming the second pixel value into an input pixel value, it can be said that it may be information for directly transforming the second pixel value to a physical amount that the input pixel value originally expressed.

The configurations of the decoding apparatus and the encoding apparatus of the second embodiment are generally the same as in FIG. 1 and FIG. 3 of the first embodiment. However, details of the setting unit 106, the second encoder 107, the second decoder 305 and the image inverse transformation unit 303 differ. Also, the decoding apparatus 301 outputs a depth image in which distance information d' is included in the pixels rather than a disparity image.

Here, the role of the setting unit 106 is explained as an important point in the difference from the first embodiment. The role of the setting unit 106 of the second embodiment, similarly to in the first embodiment, is to obtain a transformation where a shift between a decoded pixel value and an input pixel value falls within an allowable error when a second pixel value is changed by δ, and the decoded pixel value is obtained by applying an inverse transformation of pixel value transformation information for that. In order to achieve a transformation that satisfies this rule, firstly, similarly to in the first embodiment, the transformation formula g(m) for transforming from m to d is obtained, and then a transformation formula for transforming from n to m based on Equation (4) is obtained. In this embodiment, g(m) comprises $g_1(m)$ and $g_2(m)$, and $g_1(m)$ is similar to in the first embodiment. In order to obtain $g_2(m)$, firstly, similarly to in the first embodiment, $g_0(m)$ is obtained. For the conditional expression for obtaining $g_0(m)$, because the rounding 604 of FIG. 6 is unnecessary, a function that satisfies the following Equation (7) below may be obtained in place of Equation (5) of the first embodiment.

$$\begin{cases} g_0(m + \delta + 0.5) = g(m) + e \\ g_0(0) = f(n_{max}) \end{cases} \quad (7)$$

Solving the above described Equation (7) results in the following.

$$g_0(m) = \frac{e}{\delta + 0.5} m + f(n_{max})$$

If a transformation that is similar to in the first embodiment is performed for $g_0(m)$, it is possible to obtain $g_2(m)$ and g(m).

In the second encoder 107, as described previously, information for obtaining the distance d' (function g parameter) from the pixel value m' of the second image is encoded. Also, the second decoder 305 decodes the pixel value inverse transformation information (the function g) which is encoded by the second encoder 107.

In the image inverse transformation unit 303, a depth image is obtained by applying a transformation by the function g to the pixel values of the second image. The pixel values of the depth image correspond to d' of FIG. 6.

Note that the decoded pixel value n' in the second embodiment is not decoded explicitly, but if the transformation $f^{-1}$ is applied to d', and the rounding 604 is applied to a non-integer decoded pixel value $n_d$, n' can be decoded. In the present embodiment, the difference between $n_d$ and n is guaranteed to fall within the error defined by the allowable error information. However, because the error of the rounding 604 is not considered when determining the pixel value transformation information, it cannot be guaranteed that the error between n' and n will fall within the allowable error. The big difference from the first embodiment of the present embodiment is that by obtaining g(m) without considering the error of the rounding 604, the transformation formula $g_0(m)$ can be expressed by a simpler transformation formula compared to in the first embodiment. With this, it can be considered that the effects that, compared to the first embodiment, implementation is easier, and processing is at a higher speed can be achieved.

Note that, in the present embodiment, an example that does not consider an error of the rounding 604 of FIG. 6 is illustrated, but in a case where the second pixel value m can take a value other than an integer, the error of the rounding 601 need not be considered. Even in such a case, it is possible to configure an encoding apparatus by the same concept as in the present embodiment.

This concludes explanation of the second embodiment. By virtue of the above-described configuration, similarly to in the first embodiment, it is possible to realize an encoding apparatus capable of encoding an image while suppressing a maximum value of an error that occurs due to compression of pixels of an input image to an allowable error that allowable error information defines or less. Also, as effects particular to the present embodiment, the effects that, compared to the first embodiment, implementation is easier, and processing is at a higher speed can be obtained.

Third Embodiment

In the first embodiment, specific examples of allowable error information (condition 1, and condition 2) were defined, and an explanation was given for a method of pixel value transformation that is effective in that case. In contrast to this, in the present embodiment, explanation is given for a method of pixel value transformation that can be applied in a case where the allowable error information can be provided in a form of a table that designates particular allowable errors in accordance with the pixel values. The pixel value transformation of the present embodiment can be used in a more general-purpose manner than in the first embodiment.

Figures 8, 9:
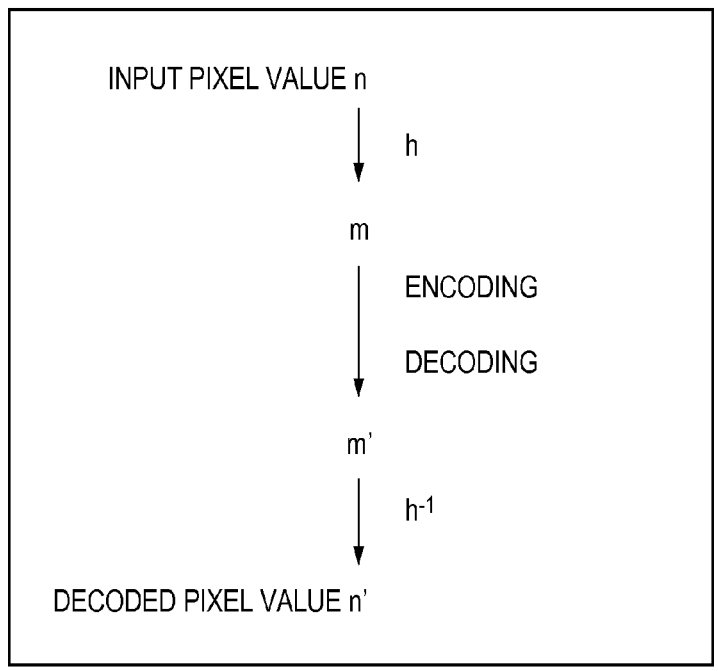
FIG. 8 is a view for explaining a flow of a data transformation according to a third embodiment.
FIG. 9 is a view for explaining allowable error information according to the third embodiment.

In FIG. 8, a flow of a data transformation in the present embodiment is illustrated. A pixel value transformation h is applied to the input pixel value n and the pixel value m is obtained. The pixel value m is encoded and decoded, and the pixel value m' is obtained. The difference between m and m' is within the constant δ at a maximum. Next, a transformation $h^{-1}$ is applied to the pixel value m', and the decoded pixel value n' is obtained. FIG. 8 is a view corresponding to FIG. 6 of the first embodiment, and the transformation from n to m in FIG. 6, which is performed in the two stages of the transformations f and $g^{-1}$, is collected into the transformation h. In the first embodiment, in order to illustrate an example of an encoding that is particularly effective in a case where the input pixel value expresses a disparity, explanation was given for a flow of data transformation in which the distance d is sandwiched between input pixel value n and the second pixel value m in order to simply the explanation. However, in the present embodiment, explanation is given for a transformation from n to m directly without going through the distance d for a general-purpose method that can be used effectively whatever physical amounts the pixel values correspond to. Note that, for the original definition of the inverse transformation, the following equation is established.

$$n = h^{-1}(h(n))$$

However, the transformations h and $h^{-1}$ which are described in the present embodiment do not necessarily satisfy this relationship. However, because these transformations perform two-way transformation of an input pixel value and a second pixel value, these are called inverse transformations so that the correspondence can be easily understood.

The block diagram of the encoding apparatus explained in the third embodiment is the same as that of the encoding apparatus 101 of FIG. 1. Also, the role of an encoding apparatus 101 is similar to in the first embodiment in that it is to encode an image while suppressing a maximum value of an error generated due to compression of pixels of the input image to less than or equal to a value that allowable error information designates. The big difference between the third embodiment and the first embodiment is the allowable error information input by the acquisition unit 105, and the pixel value transformation information that the setting unit 106 sets based on the allowable error. Below, with a focus on differences with the first embodiment, explanation will be given for details of the third embodiment.

A disparity image is input into the image input unit 102. Note that similar to in the first embodiment the input image is not limited to a disparity image. In order to simplify the following explanation, the pixel values of the input disparity image are assumed to take values from 0-7.

In the acquisition unit 105, allowable errors in accordance with the pixel values are input in a table form. For the allowable errors, in a case where the same error is allowed in the positive and negative directions for one value, one value is input for each pixel value; in a case where different errors are allowed in the positive and negative directions for one value, two values are input for each pixel value. Here, an example of the latter is illustrated in FIG. 9. FIG. 9 is a table illustrating allowable errors for each input pixel value, and for example, for an input pixel value "4", the allowable error "2" is provided for the positive direction, and the allowable error "1" is provided for the negative direction. In other words, for the input pixel value "4", a change within a range 3-6 by an error due to encoding is allowed. Also, the numbers of the allowable errors in FIG. 9 that are surrounded by circle marks indicate that the pixel value after degradation includes an upper limit or a lower limit of the effective area of the pixel value (0 or 7 in the example of the present embodiment) in the allowable error.

A relationship between the decoded pixel value n' and the input pixel value n that the allowable error information defines in FIG. 9 is illustrated in FIG. 10A. In FIG. 10A, the abscissa axis indicates the input pixel n, and the ordinate axis indicates the decoded pixel n', and the range of values that n' can take with respect to the pixel value n is illustrated by a solid line. The black circles in the figure are the points where n=n', and a solid lines extend in accordance with the allowable errors above and below those points.

The setting unit 106 generates a table that defines the pixel value transformation h which transforms from the pixel value n to m. Then, the image transforming unit 103 generates the second image into which the respective pixel values of the input image are transformed based on this table. Then, the first encoder 104 applies constant precision guaranteed encoding which compresses an image while guaranteeing that the shift due to compression of the pixel values for the second image that is generated falls within a constant δ. The flow of this processing is similar to in the first embodiment, but the detail of the setting unit 106 is different, and is described below.

The object of the setting unit 106 is similar to in the first embodiment. Specifically, the pixel value transformation information and the pixel value inverse transformation information are defined such that when a second pixel value m is changed by δ, and a decoded pixel value is acquired by applying an inverse transformation that the inverse transformation information $h^{-1}$ defines for that, a shift between the decoded pixel value and the input pixel value falls within an allowable error. Below, explanation is given using an example in which it is assumed that δ=1, and a pixel value (inverse) transformation table for which the shift between the input pixel value n and the decoded pixel value n' falls within the ranges illustrated in FIG. 10A is generated.

Note that, the following algorithm operates with δ being any particular value, and because the compression rate changes depending on δ, it is advantageous that it be set to a suitable value. When δ is too small, e.g. when δ=0, lossless compression must be performed by the first encoder 104, and because the advantage that the pixel value may be shifted within an allowable error is not taken advantage of, it can be considered that the compression rate will decrease. On the other hand, when δ is made to be large, the bit depth of the second pixel values becomes larger than the bit depth of the input pixel value, and this introduces an increase of a data amount, an increase of memory usage when encoding, or the like. In the present embodiment, in the table of the allowable error illustrated in FIG. 9, amongst the allowable errors that are not surrounded by a circle, δ is set to a smallest value (i.e. 1). When setting in this way, the bit depth of the second pixel value is necessarily smaller than the bit depth of the input pixel value. In other words, the total number of the second pixel values is less than the total number of the pixel values of the disparity image. With this, encoding that reduces the data amount of the disparity image and takes advantage of the fact that the pixel values may be shifted by the first encoder 104 as long as it is within the allowable error is possible.

Explanation is given using FIG. 10B for a basic concept of a method of realizing in the third embodiment a pixel value transformation that is such that the shift of the decoded pixel value n' when the second pixel value m is changed by δ falls within the allowable error in the setting unit 106. FIG. 10B is a graph that leaves only portions corresponding to n=1 and n=4 of FIG. 10A for explanation.

Basically, it is sufficient to perform the transformation to satisfy:

transformation rule 1: "allot 2δ+1 or more quantizing representative values of m within the allowable errors of each of the pixel values of n, and transform each pixel value n to a value at a center of the quantizing representative values of m within the allowable error" Here, the "value at a center of the quantizing representative values of m within the allowable error" is strictly speaking a "value at for which there are δ or more quantizing representative values respectively above and below in the allowable error". In the example of FIG. 10B, as shown by the dotted lines 1001, 1002, and 1003, 3 (i.e., 2δ+1) quantizing representative values are allotted for an allowable range of n=4, and n=4 may be transformed into a value corresponding to the dotted line 1001, which i the center of the 3 quantizing representative values. Transformation rule 1 is a condition sufficient to achieve an objective, but in order to transform more efficiently:

transformation rule 2: "in a case where an upper limit (lower limit) of the effective area of the pixel value is included in the allowable error, allot δ+1 or more quantizing representative values of m within the allowable error of each of the pixel values of n, and transform each pixel value n to a smallest value (largest value) of the quantizing representative values of m within the allowable error"

may be performed. Note that "transform each pixel value n to a smallest value (largest value) of the quantizing representative values of m within the allowable error", is strictly speaking a value at for which there are δ or more quantizing representative values above (below). For example, in the example of FIG. 10B where n=1, the allowable error range includes the lower limit of the effective area of the pixel values, and therefore two quantizing representative values are allotted in the allowable error (i.e., δ+1), and n=1 is transformed into the quantizing representative value corresponding to the dotted line 1004 whose value is smallest out of these two. In this way, even if the pixel value of m is shifted by +δ, it can be guaranteed to fall within the allowable error of n as illustrated by the dotted line 1005. Also, because n includes the lower limit of the effective area of the pixel values in the allowable error, it can be guaranteed that it will fall within the allowable error even if the shift in the −δ direction is not considered particularly. In this example, explanation was given for a case in which the lower limit of the effective area of the pixel values is included in the allowable error, but the same concept can be applied in the case where the upper limit is included. Also, transformation rule 3: "In a case where both the upper limit and the lower limit of the effective area of the pixel values are included in the allowable error, allot one or more quantizing representative values in the allowable error, and transform each pixel value n to any value of the quantizing representative values of m within the allowable error"

may be performed, but because the occurrence of such a situation is very rare, detailed explanation is omitted below.

Figure 11:
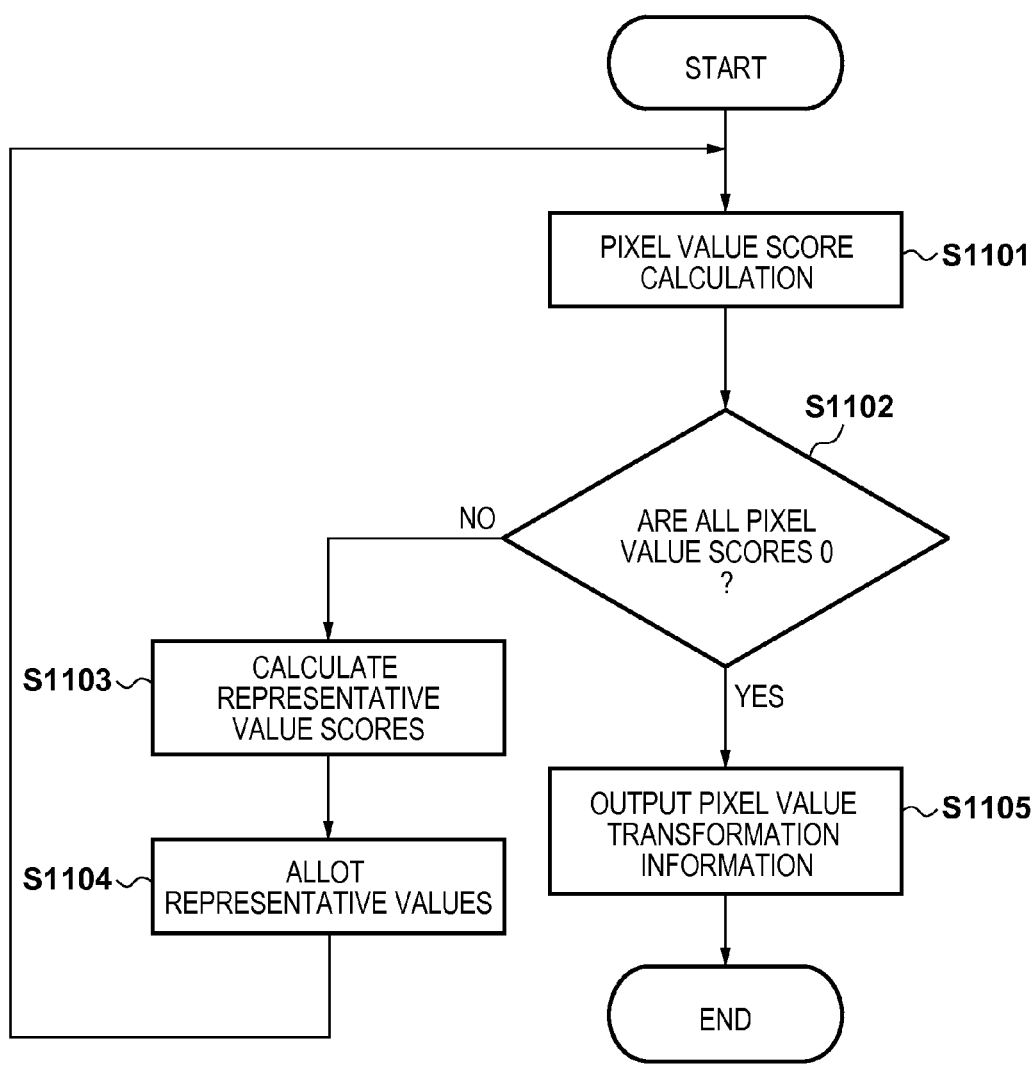
FIG. 11 is a flowchart for processing that a setting unit performs according to the third embodiment.

In order to realize a pixel value (inverse) transformation that satisfies the above described transformation rules, processing for setting the pixel value transformation information of the setting unit 106 is processed in accordance with the flow of FIG. 11 in the third embodiment. Explanation of each process of FIG. 11 is given indicating examples in FIGS. 12A-12C.

Figure 12A:
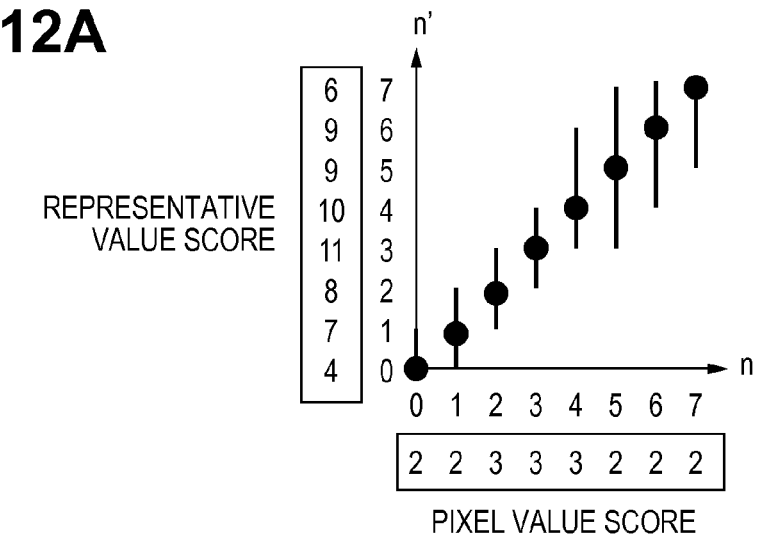
FIGS. 12A-12C are views for explaining an embodiment of a setting unit according to the third embodiment.

In step S1101, the setting unit 106 sets in the allowable ranges of each of the pixel values how many quantizing representative values of m may be allotted. In FIG. 12A, an example of pixel value scores corresponding to a graph of allowable ranges illustrated in FIG. 10A is illustrated. By the previously described transformation rules, in an initial state, for the pixel value score, 3 (i.e. 2δ+1) or 2 (i.e. δ+1) is allotted.

In step S1102, the setting unit 106 determines whether all of the pixel value scores are 0. In the case where this determination is YES, it is possible to determine that "allotment of quantizing representative values of m" that satisfies the transformation rules is performed.

In step S1103, the setting unit 106 obtains a representative value score of each of the pixel values. The representative value score is a value that expresses a priority as to which pixel value of n to allot a quantizing representative value of m. In the example of the present embodiment, the representative value score of each of the pixel values uses "a sum of the pixel value scores of the pixel values who include that pixel value in their allowable ranges". This is something that reflects the concept that it is good to select "a value included in an allowable range of as many pixel values as possible, and a region for which it is necessary to allot many quantizing representative values" for the representative value score. A concrete example of representative value scores is illustrated in FIG. 12A. For example, the n pixel value "3" is included in the allowable error of the pixel values "2-5". Accordingly, "11" which is the sum of the pixel value score of the pixel values "2-5" becomes the representative value score.

In step S1104, the setting unit 106 allots an m quantizing representative value to the n pixel value whose representative value score is a maximum. As shown by the dotted line 1201 of FIG. 12B, an m quantizing representative value is allotted for the n pixel value "3". Note that when, as a priority in a case where there are a plurality for which the representative value score is the maximum, an allotment to a pixel value that most reduces the sum total of the pixel value scores is performed, it can be considered that it is advantageous because it is possible to satisfy the determination condition of step S1102 earlier. Also, as the next priority order, it is advantageous when a pixel value for which a representative value is not allotted yet is allotted preferentially because it is possible to prevent many representative values being allotted concentratedly in one place. In a case where even then the priority is not determined uniquely, the one for which the pixel value is the smallest may be allotted preferentially.

Figure 12B:
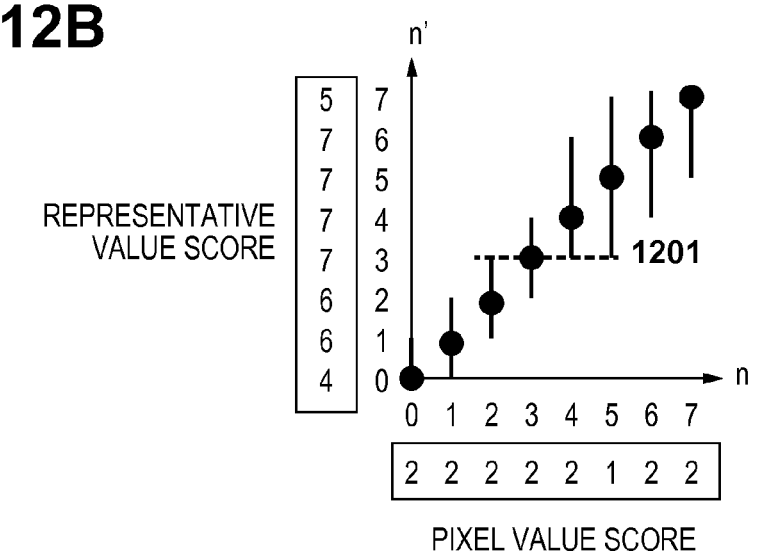

Once again, in step S1101, the setting unit 106 calculates the pixel value score. In the example of FIG. 12B, due to the representative value allotment, the pixel value scores of the n pixel values 2-5 are each reduced by 1.

Once again, in step S1102, the setting unit 106 updates the representative value scores. In the example of FIG. 12B, an example is shown in which in conjunction with updating of the pixel value scores, the representative value scores are updated.

Figure 12C:
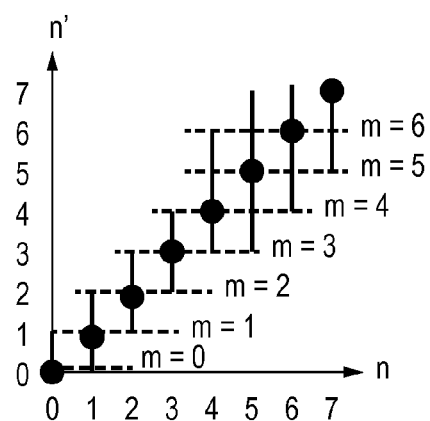

The setting unit 106 repeats the above processing from step S1101 to step S1104 until it is determined at step S1102 that all of the pixel value scores are 0. As a result, as is shown in FIG. 12C, a quantizing representative value of m is allotted for the pixel values 0-6 of n, and in order from the smallest to the largest the representative values of these is associated for the pixel values 0-6 of m. Looking at FIG. 12C, it can be confirmed that 3 (i.e. 2δ+1) or 2 (i.e. δ+1) quantizing representative values are allotted for the allowable ranges of each of the pixel values of n. In other words, it is possible to confirm that it is possible to allot quantizing representative values that satisfy the conditions of transformation rules 1 and 2.

Next, in step S1105, the setting unit 106 obtains the h and $h^{-1}$ pixel value transformations of FIG. 8 based on the relationship of n and m obtained in step S1104. For the pixel value transformation h, as explained previously in transformation rules 1 and 2, it is sufficient to transform into a value for which δ or more quantizing representative values exist both above and below (the appropriate one of these in a case where the allowable error of n includes an upper limit or a lower limit of the pixel values) from the quantizing representative values of m in the allowable error of each of the pixel values of n. Also, in the case where there are a plurality of candidates that satisfy those conditions, it may be transformed into a quantizing representative value allotted to a position that is closest to the pixel value of n itself. In FIG. 13A, a table that defines the pixel value transformation h obtained from the allotment of the quantizing representative values of m obtained in FIG. 12C is illustrated. Also, for the pixel value transformation $h^{-1}$, it is possible to uniquely obtain n corresponding to each pixel value of m from FIG. 12C. An example of this is illustrated in FIG. 13B.

This concludes the explanation of the setting unit 106 in the third embodiment. Operation of portions other than the encoding apparatus 101 is similar to in the first embodiment, other than the fact that the pixel value transformation information is changed from a function to a table. Also, decoding of the outputted encoded data can be performed by the decoding apparatus 301 similarly to in the first embodiment.

Additionally, in the present embodiment, a quantizing representative value of the second pixel values is allotted to an integer value of an effective area of an input pixel value, but it is possible to allot to a decimal value. In such a case, if a transformation is performed to satisfy the above described transformation rules, it is possible to realize an encoding with a guarantee of precision in accordance with the pixel values. Also, for a method of obtaining a transformation that is more suitable from the transformations that satisfy the transformation rules, as explained in the present embodiments, the concept of obtaining representative value scores, and preferentially allotting representative values from the thing with the highest representative value score can be applied. Also, in a case where the allowable error of each of the pixel values defined by the allowable error information is a decimal number, the concept of the present embodiment is similarly applicable.

This concludes explanation of the third embodiment. By virtue of the above-described configuration, similarly to in the first embodiment, it is possible to realize an encoding apparatus capable of encoding while suppressing a maximum value of an error that occurs due to compression of pixels of an input image to an allowable error that allowable error information defines or less. Also, as an effect particular to the third embodiment, the encoding apparatus can be applied in a case where the allowable error information is provided in a form of a table that designates particular allowable errors in accordance with pixel values.

Additionally, in the embodiments described above, the first encoder 104 illustrates an example of encoding in accordance with JPEG-LS (near-lossless mode thereof). However, a means (an encoding control unit) for controlling an encoding unit that encodes an image while guaranteeing that a shift of a pixel value before and after encoding falls within a constant δ is sufficient, and the encoding unit itself is not necessarily limited to JPEG-LS.

Fourth Embodiment

In the first embodiment, C is defined to be a suitable constant considering the connection with $g_1(m)$, but here explanation is given for a method of calculating a more suitable C. Here, for simplification, it is assumed that in Equation 2, P and n-A are always positive. As mentioned previously, in the present embodiment, as a basic approach, (i) the setting unit 106 transforms each pixel value n of the depth image (the smaller the more distant) into a reduced tone distance expression m (the larger the more distant), and (ii) the first encoder 104 performs a near-lossless encoding. (iii) Upon decoding, the second decoder 305 performs an inverse transformation of the pixel value m' which includes an error, and obtains a decoded pixel value n'. The distance error $\epsilon(n)$ that occurs at this time is defined by Equation (8) below:

$$\epsilon(n) = |f(n') - f(n)| \quad (8)$$

Conditions for satisfying $\epsilon(n) \le e$ (i.e. condition 2 described in the first embodiment) in a portion in which the precision is excessive where a reduced tone distance acquisition function $g_0(m)$ that transforms a reduced tone distance expression m into a distance is less than a predetermined distance are derived. Below, specific processes corresponding to the above (i)-(iii) is illustrated. These correspond to FIG. 15, and a state is illustrated for a case in which the error of the distance that occurred is a maximum.

(i) transformation of the pixel value n into reduced tone expression m $$m_0 = k(n) = g_0^{-1}(f(n))$$

$$m = \text{ROUND}(m_0) \quad (9)$$

(here ROUND(–) performs rounding off)

By rounding off to an integer, a maximum error in the reduced tone expression is generated.

(ii) The reduced tone image obtained in (i) is encoded by JPEG-LS. By encoding, a maximum error of δ is generated in the reduced tone expression. The value at this time is set to be m'.

(iii) By an inverse transformation, the decoded pixel value n' is obtained.

$$n' = \text{ROUND}(k^{-1}(m')) \quad (10)$$

By rounding off to an integer, a maximum error of 0.5 is generated in the original expression.

Figures 15, 16:
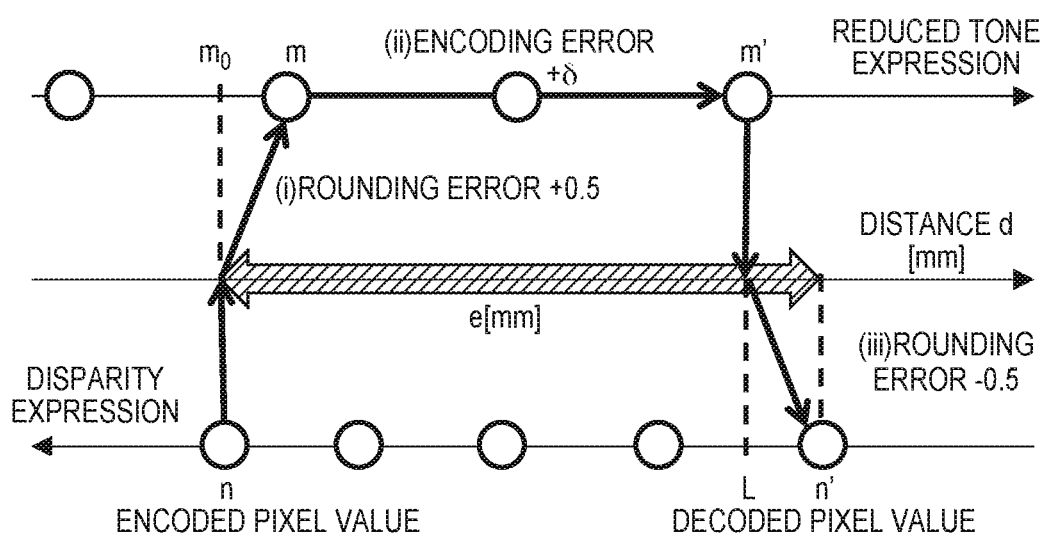
FIG. 15 is a view for explaining an error due to encoding.
FIG. 16 is a view for explaining an image capturing mode and an allowable error of a distance according to a fifth embodiment.

To repeat, by the above processing, a maximum rounding error of 0.5 occurs respectively in (i) and (iii), and in (ii) a maximum error of 5 occurs due to encoding. Considering these errors, to reduce the amount of encoded data by minimizing the tonal number, it is sufficient that e(n)=E as shown in FIG. 15, and it is optimal that $g_0(m)$ satisfies the following Equation (12).

$$\begin{cases} g_0(m_0 + 0.5 + \delta) = f(L) \\ f(L - 0.5) - g_0(m_0) = e \end{cases} \quad (12)$$

The basic consideration of this is that a pixel value transformation that does not depend on f(n), and the solution of $g_0(-)$ in the case where f(n) is provided by Equation (2), and handling thereof is illustrated below. When f(–) of Equation (12) is expanded by Equation (2), the following Equation (13) is obtained.

$$g_0(m_0 + 0.5 + \delta) = \frac{2P\{g_0(m) + e\}}{g_0(m) + 2P + e} \quad (13)$$

The equation (13) can be transformed as follows.

$$\frac{g_0(m + 0.5 + \delta) - \beta}{g_0(m + 0.5 + \delta) - \alpha} = R \cdot \frac{g_0(m) - \beta}{g_0(m) - \alpha}$$

When the above described recurrence formula is solved, the following Equation (14) is obtained.

$$g_0(m) = \frac{\beta - \alpha}{1 - h_m R^m} + \alpha \quad (14)$$

where $g_0$ is a minimum distance that the device can output. For α and β, the solution of $$x = \frac{2P(x + E)}{x + 2P + E}$$

-continued makes $$R = \left(\frac{2P-\beta}{2P-\alpha}\right)^{\frac{1}{\delta+0.5}}$$

$$h_0 = \frac{g_0-\beta}{g_0-\alpha}$$

Next, the portion of excessive precision (d<dt) is defined. $z_t$ is defined by the following Equation (15).

$$|(f^{-1})'(d)|=|(g_0^{-1})'(d)| \tag{15}$$

This is a range where the tonal number is reduced by the transformation, and $d_t$ is a distance where the slope of g(m) matches f(n). Here, the pixel value transformation is performed in a case where n>$f^{-1}$(dt). Note that (−)' expresses the derivative of d. Also, in order to maintain continuity of correspondence between the distance and the pixel value after transformation, it is sufficient to set as follows:

$$n_t = [f^{-1}(d_t)]$$

$$C = n_t + \text{ROUND}(k(n_t)) + 1$$

Note that here, it is possible to redefine k(n) with the following Equation (16).

$$k(n) = C - g^{-1}(f(n)) \tag{16}$$

Fifth Embodiment

In the first embodiment, in the setting unit 106, transformation is calculated so as to satisfy the allowable error acquired by the acquisition unit 105, and the result is set. In the present embodiment, an example is illustrated in which 2 types of the pixel value transformation information are obtained beforehand, and these are switched in accordance with the allowable error information in the setting unit 106.

The device configuration and the processing flow in the present embodiment are similar to those of the first embodiment, and can be expressed by FIG. 1 and FIG. 2. However, because the details of the processing differ, explanation of the details is supplemented.

Firstly, in the present embodiment, in the acquisition unit 105, an image capturing mode is received as information that indirectly designates the allowable error. Examples of image capturing modes are illustrated in FIG. 16. Here, it is assumed that a human body detection mode and a posture recognition mode are designated as image capturing modes. A precision e sufficient for the image capturing modes, is assumed to be 100 [mm] in the human body detection mode, and 30 [mm] in the orientation recognition mode respectively. This is because it can be considered that in a case where distance information is used for human body detection, there will be sufficient detection precision to be able to separate a human and a background, and an overlapping of humans with each other. Also, this is because in a posture recognition it can be considered that a posture estimation precision will be sufficient if a positional relationship between main joints can be understood. Additionally, the parameter e above is the same as the parameter e shown graphically in FIG. 5B.

Next, in the setting unit 106, in accordance with the image capturing mode acquired by the allowable error information acquisition unit 105, the pixel value transformation information is selected. For the pixel value transformation information, a transformation table is calculated in advance respectively in accordance with the 2 image capturing modes described above, stored in a memory unit (not shown), and either of these is read out in accordance with the image capturing mode. Note that regarding the calculation of the transformation information for each parameter e, it can be obtained by the method by which it is obtained in the first embodiment. In the first embodiment, the method of calculating of a transformation formula was described; it is easy to obtain a transformation table from that.

In the second encoder 107, the information of the transformation table set by the setting unit 106 is sent. Note that if a corresponding decoding apparatus has a memory unit for storing an inverse transformation table in accordance with the image capturing mode, then the encoding of the transformation table is not necessary, and it is sufficient to encode only information for distinguishing the image capturing mode. Because in the example of the present embodiment, there are 2 image capturing modes, the image capturing mode may be encoded in 1 bit of data.

The encoded data output by the encoding apparatus explained in the present embodiment can be decoded by the decoding apparatus of FIG. 3 similarly to in the first embodiment. Note that as described previously, in the second decoder 305, either of the inverse transformation tables that are calculated beforehand may be selected in accordance with the image capturing mode and read from the memory unit (not shown) in accordance with the image capturing mode.

This concludes explanation of the present embodiment. By virtue of the above-described configuration, similarly to in the first embodiment, it is possible to realize an encoding apparatus capable of encoding an image while suppressing a maximum value of the error that occurs due to compression of the pixels of an input image to an allowable error that allowable error information defines or less. As an effect particular to the present embodiment, there is the effect that because the pixel value transformation information is calculated beforehand, and is switched selectively in accordance with the image capturing mode, pixel value transformation information calculation processing becomes unnecessary, and the processing load becomes smaller.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-206674, filed Oct. 7, 2014, and Japanese Patent Application No. 2015-148849, filed Jul. 28, 2015, which are hereby incorporated by reference herein in their entirety.

What is claimed is:

1. An encoding apparatus operable to encode an image in accordance with allowable error information that defines an allowable error corresponding to a pixel value, the apparatus comprising:
one or more processors; and
at least one memory coupled to the one or more processors, the at least one memory having instructions stored thereon which, when executed by the one or more processors, cause the encoding apparatus to:
set transformation information for transforming a pixel value of an image that is an encoding target into a second pixel value in accordance with the allowable error information,
transform each pixel value of an image that is an encoding target based on the pixel value transformation information to generate a second image comprised by pixels after the transformation,
encode the second image such that a difference in a pixel value before and after encoding is within a constant δ that is set in advance, and
generate pixel value inverse transformation information, based on the pixel value transformation information, for transforming a pixel value of the second image into a value related to a pixel value of an input image, and encode the generated pixel value inverse transformation information using a lossless encoder,
wherein information for performing a transformation is set as the transformation information such that, in a case where a pixel value of the second image is shifted by δ, a shift of a pixel value of an input image falls within an allowable error.

2. The encoding apparatus according to claim 1, wherein the generated pixel value inverse transformation information is information for transforming a pixel value in the second image into a pixel value corresponding to the image that is the encoding target.

3. The encoding apparatus according to claim 1, wherein the generated pixel value inverse transformation information is information for transforming a pixel value in the second image into a physical amount.

4. The encoding apparatus according to claim 1, wherein the second image is encoded in accordance with JPEG-LS.

5. The encoding apparatus according to claim 1, wherein an allowable error is indirectly defined in accordance with a pixel value of an image that is an encoding target in accordance with the allowable error information.

6. The encoding apparatus according to claim 1, wherein the image that is the encoding target is a disparity image that expresses a distance between an image capturing apparatus and a photographic subject by a disparity, and the allowable error information is information that designates an allowable error in a form that combines a constant error in a disparity expression and a constant error in a distance expression.

7. The encoding apparatus according to claim 1, wherein the at least one memory includes further instructions which, when executed by the one or more processors, cause the encoding apparatus to:
specify a region of interest in an image, and
calculate the allowable error information so that an error in the region of interest becomes smaller than an error of regions other than the region of interest.

8. The encoding apparatus according to claim 1, wherein the at least one memory includes further instructions which, when executed by the one or more processors to cause the encoding apparatus to:
for each pixel value of an image that is an encoding target,
allot, in a case where neither an upper limit nor a lower limit of a pixel value effective area is included in an allowable error, $2\delta+1$ or more quantizing representative values within an allowable error,
allot, in a case where either an upper limit or a lower limit of a pixel value effective area is included in an allowable error, $\delta+1$ or more quantizing representative values within an allowable error, and
allot, in a case where both an upper limit and a lower limit of a pixel value effective area are included in an allowable error, 1 or more quantizing representative values within an allowable error, and
wherein the pixel value transformation information is calculated based on the allotted representative values.

9. A method of controlling an image encoding apparatus operable to encode an image in accordance with allowable error information that defines an allowable error corresponding to a pixel value, the method comprising:
setting transformation information for transforming a pixel value of an image that is an encoding target into a second pixel value in accordance with the allowable error information;
transforming each pixel value of an image that is an encoding target based on the pixel value transformation information to generate a second image comprised by pixels after the transformation;
encoding the second image such that a difference in a pixel value before and after the encoding is within a constant δ that is set in advance; and
generating pixel value inverse transformation information, based on the pixel value transformation information, for transforming a pixel value of the second image into a value related to a pixel value of an input image, and encoding the pixel value inverse transformation information using a lossless encoder,
wherein information for performing a transformation is set as the transformation information, such that in a case where a pixel value of the second image is shifted by δ, a shift of a pixel value of an input image falls within an allowable error.

10. A non-transitory computer-readable storage medium storing a program, when read and executed by a computer, causing the computer to execute a method of controlling an image encoding apparatus operable to encode an image in accordance with allowable error information that defines an allowable error corresponding to a pixel value, the method comprising:
setting transformation information for transforming a pixel value of an image that is an encoding target into a second pixel value in accordance with the allowable error information;

transforming each pixel value of an image that is an encoding target based on the pixel value transformation information to generate a second image comprised by pixels after the transformation;

encoding the second image such that a difference in a pixel value before and after the encoding is within a constant δ that is set in advance; and generating pixel value inverse transformation information, based on the pixel value transformation information, for transforming a pixel value of the second image into a value related to a pixel value of an input image, and encoding the pixel value inverse transformation information using a lossless encoder, wherein information for performing a transformation is set as the transformation information, such that in a case where a pixel value of the second image is shifted by δ, a shift of a pixel value of an input image falls within an allowable error.

11. An encoding apparatus operable to encode an image in accordance with allowable error information that defines an allowable error corresponding to a pixel value, the apparatus comprising:

an application specific integrated circuit (ASIC) having a processor and a memory, the memory including instructions stored thereon which, when executed by the processor, cause the ASIC to:

set transformation information for transforming a pixel value of an image that is an encoding target into a second pixel value in accordance with the allowable error information, transform each pixel value of an image that is an encoding target based on the pixel value transformation information to generate a second image comprised by pixels after the transformation, encode the second image such that a difference in a pixel value before and after encoding is within a constant δ that is set in advance, and generate pixel value inverse transformation information, based on the pixel value transformation information, for transforming a pixel value of the second image into a value related to a pixel value of an input image, and encodes the pixel value inverse transformation information using a lossless encoder, wherein information for performing a transformation is set as the transformation information such that, in a case where a pixel value of the second image is shifted by δ, a shift of a pixel value of an input image falls within an allowable error.

* * * * *